United States Patent
Homchaudhuri et al.

(10) Patent No.: US 9,565,685 B2
(45) Date of Patent: Feb. 7, 2017

(54) REVERSE CHANNEL SWITCH REQUEST FROM STATIONS TO ACCESS POINTS FOR LTE/WI-FI COEXISTENCE

(71) Applicant: QUALCOMM Incorporated, San Diego, CA (US)

(72) Inventors: Sandip Homchaudhuri, San Jose, CA (US); Richard G. Bahr, Atherton, CA (US); Arunkumar Jayaraman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 14/015,783

(22) Filed: Aug. 30, 2013

(65) Prior Publication Data

US 2015/0065157 A1   Mar. 5, 2015

(51) Int. Cl.
| | |
|---|---|
| *H04W 72/00* | (2009.01) |
| *H04W 72/08* | (2009.01) |
| *H04W 84/00* | (2009.01) |
| H04W 36/00 | (2009.01) |
| H04W 36/32 | (2009.01) |

(52) U.S. Cl.
CPC ......... *H04W 72/082* (2013.01); *H04W 84/005* (2013.01); *H04W 36/0016* (2013.01); *H04W 36/32* (2013.01)

(58) Field of Classification Search
CPC ............ H04W 52/244; H04W 52/343; H04W 52/346; H04W 52/243
See application file for complete search history.

(56) References Cited

U.S. PATENT DOCUMENTS

| | | | |
|---|---|---|---|
| 8,340,580 B1 | 12/2012 | Epstein | |
| 2005/0215251 A1* | 9/2005 | Krishnan | H04L 5/0023 455/434 |
| 2006/0256747 A1* | 11/2006 | Jaakkola | H04L 1/0002 370/328 |
| 2007/0076596 A1* | 4/2007 | Roy | H04W 36/06 370/228 |

(Continued)

OTHER PUBLICATIONS

Hu et al., Interference Avoidance for In-Device Coexistence in 3GPP LTE-Advanced: Challenges and Solutions, Technology Updates on LTE Advanced, IEEE Communications Magazine, Nov. 2012, pp. 60-67.

*Primary Examiner* — Khalid Shaheed
(74) *Attorney, Agent, or Firm* — Holland & Hart LLP

(57) ABSTRACT

Methods and apparatuses are described for wireless communications coexistence. In one aspect, a first device may detect an interference produced by a second device co-located with the first device. The first device may communicate with an access point (AP) using a free or open band and the second device may communicate with a cellular network (e.g., LTE network). In response to the detected interference, a message may be transmitted to the AP from the first device with information for the AP to determine whether to switch to a different channel in the open band to communicate with the first device. The AP may receive such a message from each terminal in at least a subset of associated terminals. The AP may determine, from the messages received, to switch to the different channel in the open band and may transmit a message to the associated terminals indicating the switch.

29 Claims, 18 Drawing Sheets

(56) References Cited

U.S. PATENT DOCUMENTS

| | | |
|---|---|---|
| 2011/0165857 A1* | 7/2011 | Pihlajamaki ............ H04L 67/24 |
| | | 455/405 |
| 2012/0069766 A1 | 3/2012 | Fu et al. |
| 2012/0164948 A1 | 6/2012 | Narasimha et al. |
| 2013/0017794 A1* | 1/2013 | Kloper .............. H04W 74/0808 |
| | | 455/63.1 |
| 2013/0029704 A1 | 1/2013 | Koo et al. |

* cited by examiner

REVERSE CHANNEL SWITCH REQUEST FROM STATIONS TO ACCESS POINTS FOR LTE/WI-FI COEXISTENCE

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communication network may include a number of network devices such as access points (APs) and/or base stations or Node-Bs that can support communication for a number of wireless devices. A wireless device, or wireless terminal, may communicate with a network device bi-directionally. For example, in cellular networks, a wireless device (e.g., a user equipment or UE) may communicate with a base station via downlink and uplink. The downlink (or forward link) refers to the communication link from the base station to the wireless device, and the uplink (or reverse link) refers to the communication link from the wireless device to the base station. A similar form of communication may occur between a wireless device (e.g., station or STA) and an AP in a wireless local area network (WLAN or Wi-Fi network).

Many wireless devices are now equipped with multiple radios or modems. In one example, one of the radios may be an open or free band radio used for WLANs or Wi-Fi networks and another radio may be a radio used for cellular networks. In the past, cellular networks (e.g., Global Systems for Mobile Communications or GSM ("2G"), Universal Terrestrial Radio Access or UTRA ("3G")) used frequency bands that were sufficiently separate from the bands used by WLANs and Wi-Fi networks that interference between co-located radios in a wireless device was not a concern. With the deployment of long term evolution (LTE), however, interference may take place between LTE and Wi-Fi co-located radios because the frequency bands at which LTE operates may be close to or may overlap the frequency bands used by Wi-Fi. Mechanisms may therefore be needed to allow for effective coexistence of LTE and Wi-Fi radios by mitigating or removing the impact that such interference may have on the performance of the wireless device.

SUMMARY

The described features generally relate to one or more methods and/or apparatuses for wireless communications coexistence. In one aspect, a first device (e.g., Wi-Fi radio or modem) in a wireless terminal may detect an interference produced by a second device (e.g., LTE radio or modem) co-located with the first device in the same wireless terminal. In some cases, the first and second devices may be co-located in a same network device. The first device may communicate with an access point (AP) using a free or open band (e.g., industrial, scientific, and medical or ISM band) and the second device may wirelessly communicate with a cellular network (e.g., LTE network).

In response to the detected interference, a message may be transmitted from the wireless terminal (e.g., Wi-Fi radio) to the associated AP, where the message includes information for the AP to determine whether to switch from a current or existing channel to a different channel in the open band with which to communicate with the first device. The message, which may be referred to as a reverse channel switch request (rCSR), may be implemented as part of an information element (IE). The AP may receive such a message from each terminal in at least a subset of associated terminals. The associated terminals may be of a type (e.g., particular vendor or manufacturer) that is compatible with the AP in order to send the rCSR message (e.g., rCSR IE) and have the AP properly decode the message. Additional terminals associated with the AP that are of a different type (e.g., a different vendor or manufacturer from that of the AP) may not support sending such messages. The AP may determine to switch to the different channel based on the number of terminal sending the message and/or interference information included in the received messages. Once the AP determines that a channel switch is appropriate and also the channel to which it is going to switch to, the AP may transmit a message (e.g., a modified channel switch announcement or modified CSA (mCSA)) to the associated terminals indicating a switch to the different channel. In some cases, the AP may send a similar message to other associated terminals if the AP determines that it would be appropriate having all of its associated terminals (including those of a type different from the AP) switched to the new or different channel.

A method for wireless communications coexistence includes detecting, by a first device, an interference produced by a second device co-located with the first device, where the first device is configured to wirelessly communicate with an associated AP using an open band, and where the second device is configured to wirelessly communicate with a cellular network. The method includes transmitting a message to the associated AP in response to the detected interference, where the message includes information for the associated AP to determine whether to switch to a different channel in the open band to communicate with the first device. The information in the message may include one or both of a request that the associated AP communicate with the first device using a different channel in the open band, and one or more parameters associated with the detected interference. The one or more parameters may include one or more of a packet error rate of the first device, a signal-to-noise ratio drop of the first device, and a transmission signal power of the second device.

In some embodiments, the method includes receiving in response to the message transmitted to the associated AP, a message from the associated AP indicating a switch to a different channel in the open band for communication with the first device, and switching operation of the first device to the different channel in the open band in response to the message received from the associated AP.

A method for wireless communications coexistence includes receiving from each terminal in at least a subset of associated terminals a message having information to determine whether to switch to a different channel in an open band to communicate with the associated terminals. The method also includes transmitting a message to the associated terminals indicating a switch to the different channel in the open band. The method further includes switching to the different channel in the open band to communicate with the associated terminals. The associated terminals may be of a first type and additional associated terminals may be of a second type. In such cases, the method may further include transmitting a message to the additional associated terminals indicating a switch to the different channel in the open band, and switching to the different channel in the open band to communicate with the associated terminals and with the additional associated terminals. The first type of terminals may include terminals having a modem device from a first vendor for communication in the open band, and the second type of terminals may include terminals having a modem device from a second vendor for communication in the open band. The method may further include maintaining a current channel in the open band to communicate with the additional associated terminals while switching to the different channel in the open band to communicate with the associated terminals.

In some embodiments, maintaining the current channel in the open band to communicate with the additional associated terminals includes maintaining the additional associated terminals in a virtual device for the current channel, and switching to the different channel in the open band to communicate with the associated terminals includes spawning a separate virtual device for the different channel.

In some embodiments, the method includes identifying a number of terminals transmitting the message and determining whether to switch to the different channel based at least in part on the number of terminals transmitting the message. Determining whether to switch to the different channel may include determining whether the number of terminals transmitting the message is greater than a threshold value.

In some embodiments, the method includes identifying a subset of the associated terminals for a downlink multi-user (MU) multiple-input multiple-output (MIMO) communications group, and switching to the different channel in the open band to communicate with the identified subset forming the downlink MU MIMO communications group. In another embodiment, the method includes identifying a subset of the associated terminals based on one or more of a throughput category that is greater than a threshold value, a number of receive/transmit (Rx/Tx) antenna chains that is greater than another threshold value, and a modulation and coding scheme (MCS) rate that is greater than yet another threshold value, and switching to the different channel in the open band to communicate with the identified subset. In yet another embodiment, the method includes identifying a subset of the associated terminals based on one or more of a throughput category that is less than a threshold value, a number of Rx/Tx antenna chains that is less than another threshold value, and an MCS rate that is less than yet another threshold value, and witching to the different channel in the open band to communicate with the identified subset.

In some embodiments, the method includes identifying an interference parameter corresponding to each of the terminals transmitting the message, and determining whether to switch to the different channel based at least in part on the interference parameter corresponding to each of the terminals transmitting the message. Determining whether to switch to the different channel may include determining whether a combination of the interference parameter corresponding to each of the terminals transmitting the message produces an interference value greater than a threshold value. The interference parameter may include one or more of a packet error rate of a first device in the terminal affected by the interference, a signal-to-noise ratio drop of the first device; and a transmission signal power of a second device in the terminal causing the interference on the first device.

An apparatus for wireless communications coexistence includes means for detecting, by a first device, an interference produced by a second device co-located with the first device, where the first device is configured to wirelessly communicate with an associated AP using an open band, and where the second device is configured to wirelessly communicate with a cellular network. The apparatus also includes means for transmitting a message to the associated AP in response to the detected interference, the message having information for the associated AP to determine whether to switch to a different channel in the open band to communicate with the first device. The information in the message may include one or both of a request that the associated AP communicate with the first device using a different channel in the open band, and one or more parameters associated with the detected interference. The one or more parameters may include one or more of a packet error rate of the first device, a signal-to-noise ratio drop of the first device, and a transmission signal power of the second device.

In some embodiments, the apparatus includes means for receiving in response to the message transmitted to the AP, a message from the associated AP indicating a switch to a different channel in the open band for communication with the first device, and means for switching operation of the first device to the different channel in the open band in response to the message received from the associated AP.

An apparatus for wireless communications coexistence includes means for receiving from each terminal in at least a subset of associated terminals a message having information to determine whether to switch to a different channel in an open band to communicate with the associated terminals. The apparatus includes means for transmitting a message to the associated terminals indicating a switch to the different channel in the open band. The apparatus further includes means for switching to the different channel in the open band to communicate with the associated terminals.

In some embodiments, the associated terminals are of a first type and additional associated terminals are of a second type. In such cases, the apparatus may include means for transmitting a message to the additional associated terminals indicating a switch to the different channel in the open band, and means for switching to the different channel in the open band to communicate with the associated terminals and with the additional associated terminals. The first type of terminals may include terminals having a modem device from a first vendor for communication in the open band, and the second type of terminals may include terminals having a modem device from a second vendor for communication in the open band. The apparatus may include means for maintaining a current channel in the open band to communicate with the additional associated terminals while switching to the different channel in the open band to communicate with the associated terminals. The means for maintaining the current channel in the open band to communicate with the additional associated terminals may include means for maintaining the additional associated terminals in a virtual device for the current channel. The means for switching to the different channel in the open band to communicate with the associated terminals may include means for spawning. The spawning may include spawning several virtual devices, multiplexed in time, on top of a single physical device having a single medium access control (MAC), baseband (BB), and radio frequency (RF) blocks.

In some embodiments, the apparatus includes means for identifying one or both of a number of terminals transmitting the message and an interference parameter corresponding to each of the terminals transmitting the message, and means for determining whether to switch to the different channel based at least in part on one or both of the number of terminals transmitting the message and the interference parameter corresponding to each of the terminals transmitting the message. The interference parameter may include one or more of a packet error rate of a first device in the terminal affected by the interference, a signal-to-noise ratio drop of the first device, and a transmission signal power of a second device in the terminal causing the interference on the first device.

In some embodiments, the apparatus includes means for identifying a subset of the associated terminals for a downlink multi-user (MU) multiple-input multiple-output (MIMO) communications group, and means for switching to the different channel in the open band to communicate with the identified subset forming the downlink MU MIMO communications group.

In some embodiments, the apparatus includes means for identifying a subset of the associated terminals based on one or more of a throughput category being greater than a threshold value, a number of receive/transmit (Rx/Tx) antenna chains being greater than another threshold value, and a modulation and coding scheme (MCS) rate being greater than yet another threshold value, and means for switching to the different channel in the open band to communicate with the identified subset.

An apparatus for wireless communications coexistence includes an interference module configured to detect an interference produced on a first device by a second device co-located with the first device, where the first device is configured to wirelessly communicate with an associated AP using an open band, and where the second device is configured to wirelessly communicate with a cellular network. The apparatus includes a message module configured to generate a message to the associated AP in response to the detected interference, where the message includes information for the associated AP to determine whether to switch to a different channel in the open band to communicate with the first device. The apparatus further includes a transmitter configured to transmit the message to the associated AP. The information in the message may include one or both of a request that the associated AP communicate with the first device using a different channel in the open band, and one or more parameters associated with the detected interference. The one or more parameters may include one or more of a packet error rate of the first device, a signal-to-noise ratio drop of the first device, and a transmission signal power of the second device.

In some embodiments, the apparatus includes a receiver configured to receive a message from the associated AP in response to the message transmitted to the AP, where the message received from the associated AP indicates a switch to a different channel in the open band for communication with the first device. The apparatus further includes a channel switch configured to switch operation of the first device to the different channel in the open band in response to the message received from the AP.

An apparatus for wireless communications coexistence includes a receiver configured to receive from each terminal in at least a subset of associated terminals a message having information to determine whether to switch to a different channel in an open band to communicate with the associated terminals. The apparatus includes a message module configured to generate a message to the associated terminals indicating a switch to the different channel in the open band. The apparatus also includes a transmitter configured to transmit the message to the associated terminals. The apparatus further includes a channel switch configured to switch to the different channel in the open band to communicate with the associated terminals. In some cases, the associated terminals are of a first type and additional associated terminals are of a second type. In those cases, the message module is further configured to generate a message to the additional associated terminals indicating a switch to the different channel in the open band, the transmitter is further configured to transmit the message to the additional associated terminals, and the channel switch is further configured to switch to the different channel in the open band to communicate with the associated terminals and with the additional associated terminals. The first type of terminals may include terminals having a modem device from a first vendor for communication in the open band, and the second type of terminals may include terminals having a modem device from a second vendor for communication in the open band.

In some embodiments, the channel switch may be further configured to maintain a current channel in the open band to communicate with the additional associated terminals while switching to the different channel in the open band to communicate with the associated terminals. The channel switch may be further configured to maintain the current channel in the open band to communicate with the additional associated terminals by maintaining the additional associated terminals in a virtual device for the current channel, and to switch to the different channel in the open band to communicate with the associated terminals by spawning a separate virtual device for the different channel.

In some embodiments, the message module is further configured to identify one or both of a number of terminals transmitting the message and an interference parameter corresponding to each of the terminals transmitting the message, while the channel switch is further configured to determine whether to switch to the different channel based at least in part on one or both of the number of terminals transmitting the message and the interference parameter corresponding to each of the terminals transmitting the message. The interference parameter may include one or more of a packet error rate of a first device in the terminal affected by the interference, a signal-to-noise ratio drop of the first device, and a transmission signal power of a second device in the terminal causing the interference on the first device.

A computer program product includes a non-transitory computer-readable medium having code for causing at least one computer to detect, by a first device, an interference produced by a second device co-located with the first device, where the first device is configured to wirelessly communicate with an associated AP using an open band, and where the second device is configured to wirelessly communicate with a cellular network. The non-transitory computer-readable medium has code for causing the at least one computer to transmit a message to the associated AP in response to the detected interference, where the message includes information for the associated AP to determine whether to switch to a different channel in the open band to communicate with the first device.

A computer program product includes a non-transitory computer-readable medium having code for causing at least one computer to receive from each terminal in at least a subset of associated terminals a message having information to determine whether to switch to a different channel in an open band to communicate with the associated terminals. The non-transitory computer-readable medium has code for causing the at least one computer to transmit a message to the associated terminals indicating a switch to the different channel in the open band. The non-transitory computer-readable medium has code for causing the at least one computer to switch to the different channel in the open band to communicate with the associated terminals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
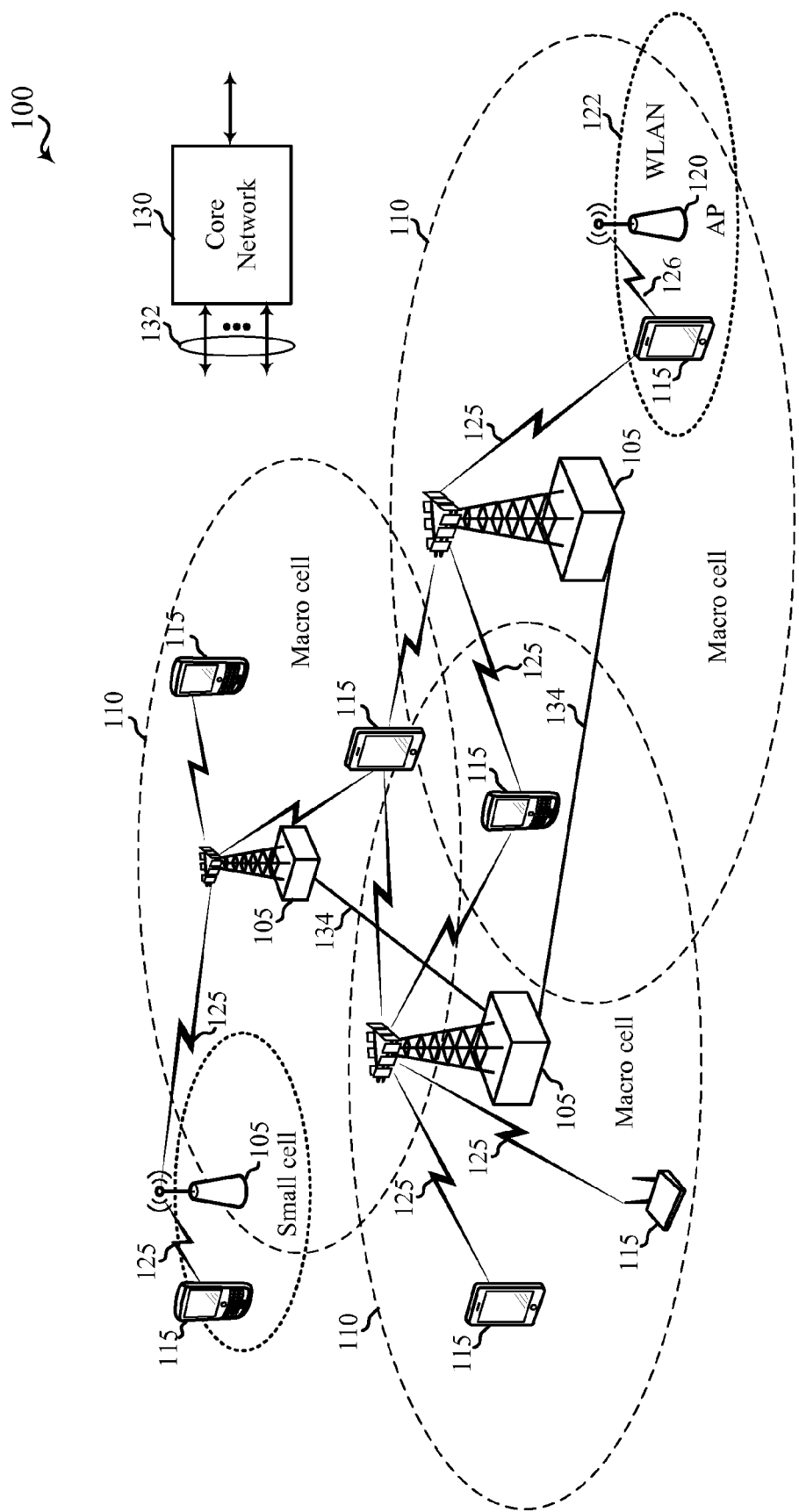
FIG. 1 shows a diagram that illustrates an example of a wireless communications system according to various embodiments.

Coexistence interference may occur between co-located devices (e.g., same wireless terminal) that transmit and receive signals in the same frequency band. For example, coexistence interference may occur between a Bluetooth modem and a Wi-Fi modem in the same terminal since they both may operate in the same open or free band (e.g., ISM band). Coexistence interference may also take place when a Wi-Fi modem is co-located with a GPS receiver. In both of these examples, however, coexistence interference occurs in open or free bands and does not involve a paid band (e.g., cellular band).

Coexistence interference, however, may also occur when one of the bands is a paid band. For example, coexistence interference may take place between certain cellular bands (e.g., some LTE bands) and open or free bands (e.g., ~2.4 GHz or ~5 GHz ISM bands) when a multi-radio wireless terminal includes both a cellular modem and an ISM modem (e.g., IEEE 802.11/Wi-Fi modem). In general, coexistence interference is produced when one of the modems is transmitting signals and the signal transmissions affect the reception of signals by the other modem. Because cellular communications (e.g., LTE) take place in paid bands, a modem communicating in free or open bands (e.g., ISM or Wi-Fi band) is likely to be given a lesser priority than that of a co-located cellular modem when conflicts (e.g., interference) occur. This approach, however, may not be suitable for certain use case scenarios. For example, when downloading video information using a cellular connection and then transmitting the video information to a display device using a Wi-Fi connection, both connections need to have the same or similar level of priority otherwise the end user experience is likely to suffer (e.g., video is not properly displayed because the Wi-Fi connection priority is lower). In other words, there may be several use case scenarios in which Wi-Fi communications should not just simply back off in the presence of cellular communications within the same band. That is, Wi-Fi communications may need a mechanism to maintain operation even in the presence of cellular (e.g., LTE) interference.

To address coexistence interference between cellular and Wi-Fi communications in multi-radio wireless terminals, for example, non-linear interference cancellation (NLIC) techniques have been proposed in which information (e.g., in-phase (I) and quadrature (Q) values) about cellular transmissions is provided from the cellular modem to the Wi-Fi modem through an interface to enable the Wi-Fi modem to cancel or mitigate the interference effects produced by the cellular transmissions. These techniques, while helpful, do not entirely alleviate the interference effects caused on the Wi-Fi modem by the cellular transmissions. Other mechanisms, such as the ones described herein, may address coexistence interference in a more effective manner in at least some circumstances.

In the 5 GHz band for Wi-Fi communications, for example, an information element (e.g., similar to CSA IE that may be referred to as a modified CSA IE or simply mCSA) may be used by the AP to announce a switch to a different channel that the AP plans to use next to communicate with associated wireless terminals (e.g., STAs). While the CSA mechanism is intended as a resource to move Wi-Fi communications away from radar signals operating in the same band (e.g., 5 GHz band) and is transmitted aligned with the beacon signal transmission of an AP, the modified CSA mechanism, which may be utilized for coexistence purposes, may be used to switch to a different channel immediately or with a variable time-offset, and not be aligned with a beacon transmission. This switch may then allow Wi-Fi communications to take place in a portion of the band that does not interfere with cellular communications (e.g., LTE).

To identify when a channel switch may be needed to alleviate coexistence interference in a number of wireless terminals, each of the wireless terminals associated with the AP that are of a particular type (e.g., a particular vendor or manufacturer) may be configured to use a new message authentication code based upon upper MAC (UMAC) protocol to send a message to the AP indicating that communication through a different channel may be needed (because of interference). The AP, which may be compatible with the wireless stations sending these messages (because the AP is from the same vendor or manufacturer) may be configured to receive and process (e.g., decode) the messages sent from the wireless stations. Those wireless stations associated with the AP that are of a different type (e.g., from another vendor or manufacturer) may not be configured to send such messages.

The message from wireless terminal of the first type, which may be referred to as a reverse channel switch request information element (rCSR IE), may include a request by the wireless station that the AP change to a new or different channel in the band to avoid the interference effects presented by cellular communications. The message may instead, or in addition, include one or more parameters indicating the level of interference from cellular communications on the Wi-Fi modem. These parameters may include a packet error rate (PER) experienced by the Wi-Fi modem, a signal-to-noise ratio (SNR) experienced by the Wi-Fi modem, a received cellular signal power experienced by the Wi-Fi modem (e.g., reference signal receive power (RSRP) or a general received signal strength indicator (RSSI) metric, specific to the interfering wireless system), and a cellular transmit signal power used by a co-located cellular modem (e.g., physical uplink control channel (PUCCH) and physical uplink shared channel (PUSCH) power for an LTE modem). In one possible embodiment, co-located interference reporting format IE, as defined in IEEE 802.v amendment specification, for example, may be used to report the co-located interference. However, such an IE generalizes interference and may therefore be challenging to report specific information about the interfering wireless system.

The AP may use the information in the messages to determine whether to make a channel switch at all, whether to switch only those wireless terminals of the first type to a different channel from the current channel, or whether to switch all of the associated wireless stations (e.g., regardless of type, vendor, or manufacturer) to a different channel from the current channel. For example, when the number or percentage of wireless stations of the first type sending channel switch request messages (e.g., rCSR IEs) is greater than a threshold level, the AP may determine to make a switch to a new or different channel. In another example, when the one or more parameters in the messages indicate a high enough level of coexistence interference across multiple wireless stations, the AP may again determine to make a switch to a new or different channel. Once the determination to switch to a different channel is made, and the channel is selected, the AP may send a modified CSA IE to those associated wireless stations that are involved in the channel switch. As noted above, in some cases just the wireless stations of the same type as the AP may be switched to the new channel while in other cases all of the associated wireless terminals may be switched to the new channel.

In cases when the AP determines to switch only the wireless stations of the same type as the AP (e.g., same vendor or manufacturer) to a different channel (e.g., channel Y without, or with mitigated, cellular interference) and keep other wireless stations (e.g., of a different type as the AP) in the current channel (e.g., channel X with higher cellular interference), the AP may use an existing virtual device (VDEV) for the current channel and may generate (e.g., spawn) a separate VDEV for the different channel (i.e., the channel with no cellular or mitigated interference). The two virtual devices may be used in a time-shared fashion when the AP has a single set of radio frequency (RF)/baseband (BB)/medium access control (MAC) resources. The AP may support single band simultaneous (SBS) communications, that is, the AP may support the ability to operate on two distinct channels on the same 2.4 GHz or 5 GHz band with necessary RF isolation for each channel and pass on information from the two channels to different digital BB/MAC modules to have a concurrent mode of operation. Thus, using SBS communications, the two virtual devices may be used concurrently with the first virtual device communicating over a first frequency supported by the RF/BB/MAC resources available at the AP while the second virtual device communicates over a second frequency supported by the RF/BB/MAC resources available at the AP.

The wireless devices or wireless terminals described herein may be configured to operate in any wireless network (e.g., a WLAN and/or in a cellular network, e.g., LTE). WLAN may refer to a network that is based on the protocols described in the various IEEE 802.11 standards (e.g., 802.11a/g, 802.11n, 802.11ac, 802.11ah, etc.) and may be generally referred to as a Wi-Fi network. Techniques described herein may be used for various wireless communications systems such as cellular wireless systems, Peer-to-Peer wireless communications, WLANs, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications to other cellular networks.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network. The terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation of the eNBs.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may operate concurrently with a cellular network and with another network such as WLAN or a Wi-Fi network (i.e., the UE 115 may also operate as a station or STA). A UE 115 may be a cellular phone, a personal digital assistant (PDA), a wireless modem, a wireless communication device, a handheld device, a tablet computer, a laptop computer, a cordless phone, a wireless local loop (WLL) station, or the like. A LIE may be able to communicate with macro eNBs, pico eNBs, femto eNBs, relays, APs and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink and uplink transmissions may be made using a licensed or paid spectrum (e.g., LTE). When the wireless device or station 115 in system 100 communicates with a WLAN or Wi-Fi network, communication links 126 may include uplink and downlink transmission between the wireless station 115 and an AP 120 providing communication coverage for a respective geographic area 122. In this example, the wireless station 115 may include multiple radios or modems (not shown) to allow it to communicate with the LTE network and with the Wi-Fi network at the same time. Such concurrent communications, however, may result in interference because of the proximity of the radios (i.e., co-location) in the wireless station 115.

In some embodiments of the system 100, various mechanisms may be used to allow for effective coexistence of LTE and Wi-Fi radios by mitigating or removing the impact that such interference may have on the performance of the wireless terminal 115. Additional features and/or aspects of the use of messages or requests from one or more wireless terminals (e.g., UEs, STAs) with multiple radios to an AP (e.g., AP 120) to address LTE/Wi-Fi interference concerns are provided below with respect to FIGS. 2-16.

Figure 2:
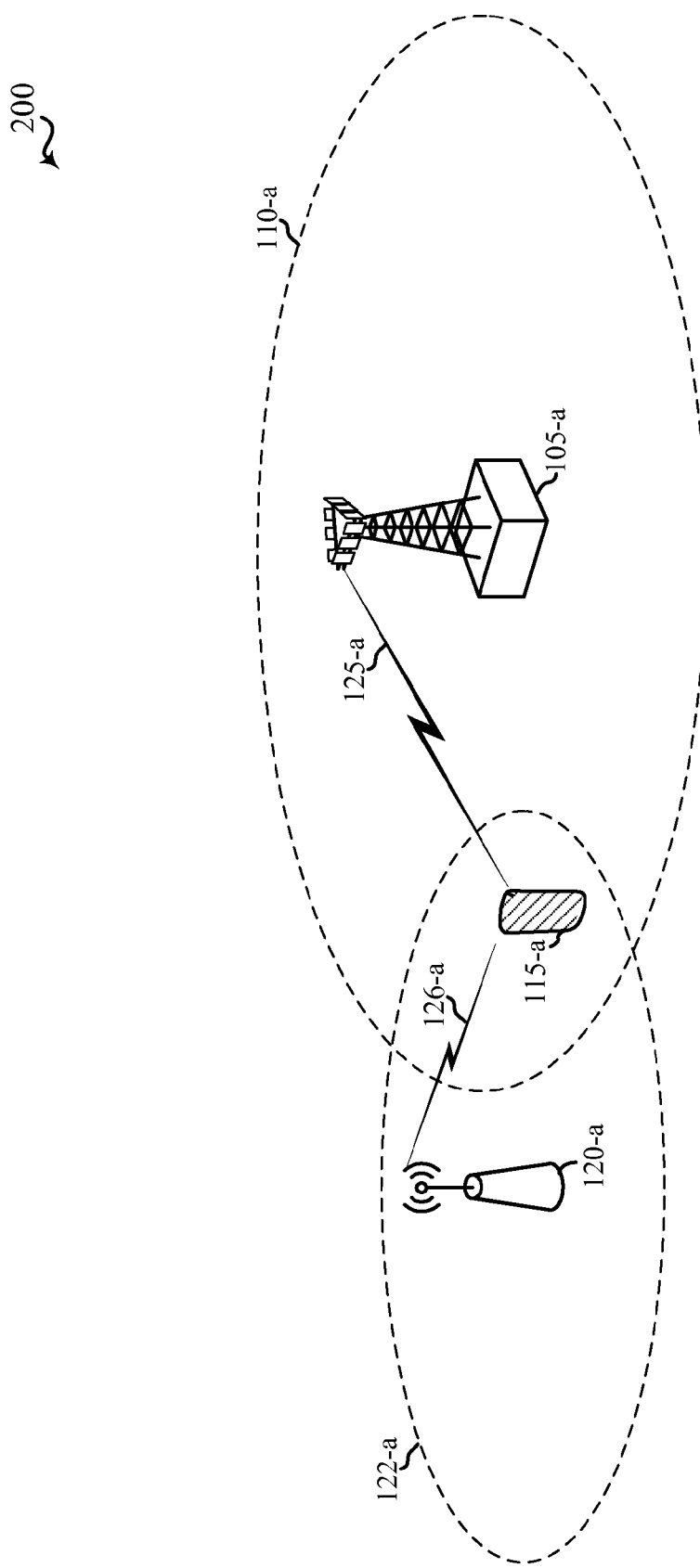
FIG. 2 shows a diagram that illustrates an example of a wireless communications system for Wi-Fi and LTE coexistence according to various embodiments.

FIG. 2 shows a diagram 200 that illustrates an example of a portion of the network 100 of FIG. 1. Diagram 200 shows an AP 120-a with coverage area 122-a in communication (e.g., communication link 126-a) with a wireless terminal 125-a. This may be an example of a WLAN or Wi-Fi network configuration similar to the one shown in FIG. 1. The wireless terminal 125-a may also be in communication with a base station 105-a with coverage area 110-a through a communication link 125-a. This may be an example of an LTE network configuration similar to the one shown in FIG. 1. The wireless station 115-a, which may be referred to as a station or STA for Wi-Fi purposes or a UE for LTE purposes, may support LTE/Wi-Fi coexistence by using one Wi-Fi radio (not shown) and one co-located LTE radio (not shown). As indicated above, LTE/Wi-Fi coexistence may result in interference because the frequency bands of the two communication networks may be sufficiently close or may overlap.

For example, LTE band 7 (B7) uses frequency-division duplexing (FDD) and is referred to as LTE-FDD-B7. LTE-FDD-B7 has an uplink bandwidth of 2500-2570 MHz and a downlink bandwidth of 2620-2690 MHz. The uplink bandwidth may cause a mild de-sensing (i.e., interference) of a Wi-Fi receiver because of the proximity of the uplink bandwidth to the 2.4 GHz Wi-Fi frequency of operation. A Wi-Fi transmitter (at ~2.4 GHz) may not typically cause de-sensing to the LTE receiver (2620-2690 MHz) because the bands are sufficiently apart.

In another example, LTE band 38 (B38) uses time-division duplexing (TDD) and is referred to as LTE-TDD-B38. LTE-TDD-B38 has a bandwidth of 2570-2620 MHz. This bandwidth may cause a mild de-sensing of a Wi-Fi receiver or transmitter while a Wi-Fi transmitter may cause a mild de-sensing of an LTE receiver or transmitter.

In yet another example, LTE band 40 (B40) uses TDD and is referred to as LTE-TDD-B40. LTE-TDD-B40 has a bandwidth of 2300-2400 MHz, which causes the most severe de-sensing of both LTE and Wi-Fi communications because the bandwidth is so close to the 2.4 GHz Wi-Fi frequency of operation.

In yet another example, LTE band 41 (B41) uses TDD and is referred to as LTE-TDD-B41. LTE-TDD-B41 has a bandwidth of 2496-2690 MHz, which causes mild to severe de-sensing of both LTE and Wi-Fi communications.

The impact of using these particular LTE bands in coexistence with Wi-Fi is as follows. For LTE-FDD-B7, the downlink performance of Wi-Fi (e.g., WLAN/IEEE 802.11a/b/g/n) may be degraded with little to no adverse effect on the performance of LTE uplink or downlink. For LTE-TDD-(B38/B40/B41), the downlink and uplink performance of Wi-Fi (e.g., WLAN/IEEE 802.11a/b/g/n) may be degraded with possible adverse effects on the performance of LTE downlink (when the Wi-Fi uplink is used). Note that coexistence interference is typically not an issue when both the LTE and the Wi-Fi radios are transmitting or when both are receiving. Coexistence interference may impact performance when one of the radios is receiving and the other is transmitting. Moreover, the LTE radio is generally viewed as the aggressor (i.e., causing the interference) and the Wi-Fi radio is generally viewed as the victim (i.e., being de-sensed because of interference).

As noted above, non-linear interference cancellation or NLIC has been proposed to help mitigate interference in those scenarios where it may not be feasible to address coexistence through physical layer (PHY) and/or the medium access control (MAC) layer protocol and scheduling. In NLIC, the LTE modem or radio may provide information as to the transmitted data (e.g., I and Q samples) to the Wi-Fi modem or radio through an interface such that the Wi-Fi modem can identify the interference components and try to suppress or minimize their effect. NLIC techniques, while helpful in many instances, are far from ideal and protocol level coexistence may be a preferred way of handling the problem in various circumstances.

Figure 3:
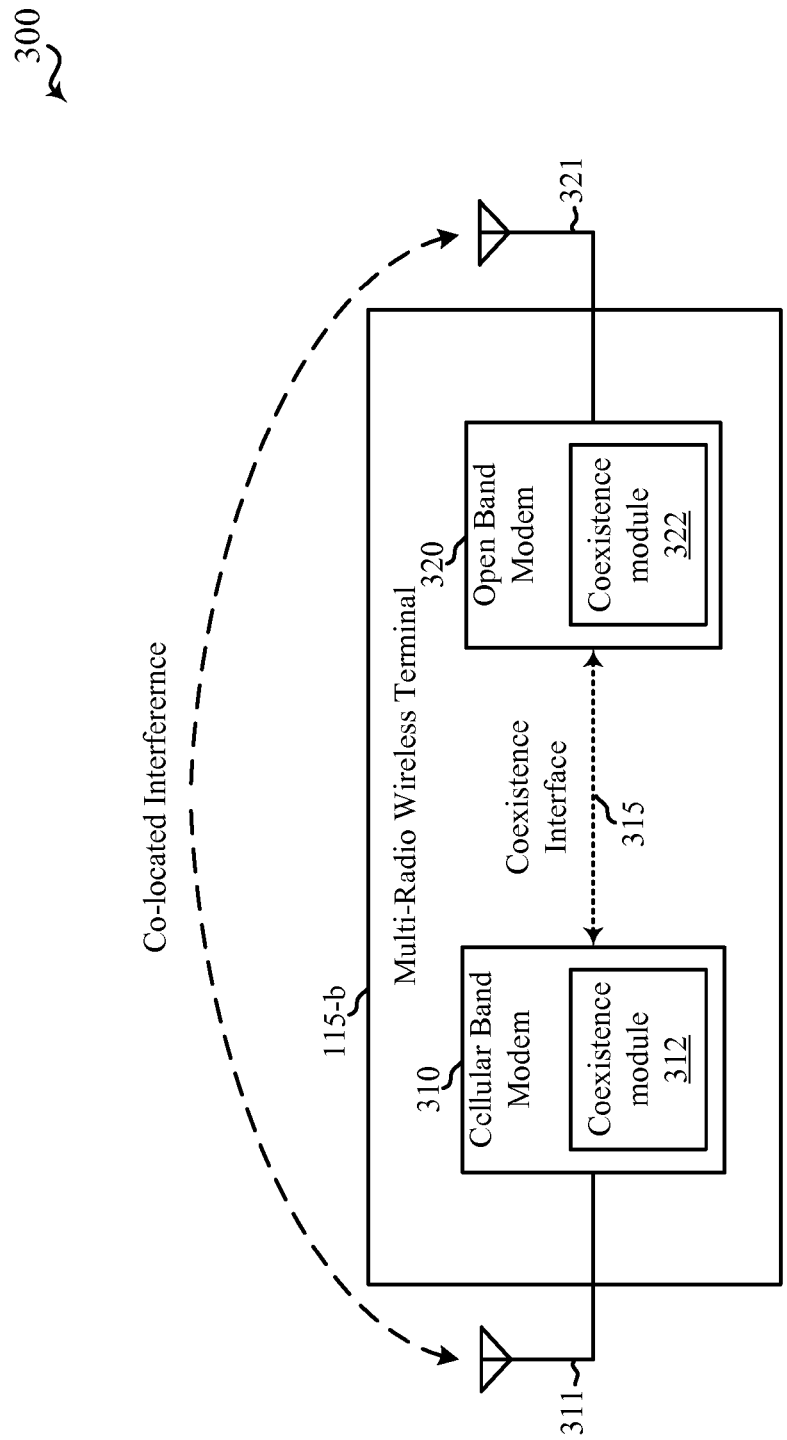
FIG. 3 shows a block diagram that illustrates an example of Wi-Fi and LTE co-located interference in a multi-radio wireless terminal according to various embodiments.

FIG. 3 shows a diagram 300 that illustrates a wireless terminal 115-b that includes multiple modems. The wireless terminal 115-b may be an example of the wireless devices 115 of FIG. 1 and FIG. 2. The wireless terminal 115-b may include a cellular band modem 310 and a free or open band modem 320. The cellular band modem 310 may be configured to perform transmission and/or reception of signals through an antenna 311 and over a cellular network such as an LTE network, for example. In this case, the cellular band modem 310 may also be referred to as an LTE modem, for example. The open band modem 320 may be configured to perform transmission and/or reception of signals through the antenna 321 and over a WLAN or Wi-Fi network that uses an open band such as the ISM band. In this case, the open band modem 320 may also be referred to as a Wi-Fi modem, for example. Because the cellular band modem 310 and the open band modem 320 are co-located in the wireless terminal 115-b, coexistence interference may take place between the two devices. The cellular band modem 310 may include a coexistence module 312 that may be configured to detect and handle interference from Wi-Fi communications, while the open band modem 320 may include a coexistence module 322 that may be configured to detect and handle interference from LTE communications. The cellular band modem 310 and the open band modem 320 may use a coexistence interface 315 to exchange information (e.g., NLIC) and/or signaling to handle certain aspects of coexistence interference.

The wireless terminal 115-b illustrates an example of a configuration of co-located devices resulting in coexistence interference. There may be, however, different types of coexistence configurations. In one configuration (e.g., handset), the cellular band modem 310 may be used to operate as an LTE UE and the open band modem 320 may be used to operate as a Wi-Fi STA. In this configuration, both devices (i.e., both modems) are generally considered to be slave devices, with the Wi-Fi STA having some control over its uplink and its downlink, but the LTE UE having little or no control over its uplink and downlink scheduling. Both devices are in a "self-peer" mode and any disruption to the reception (Rx) and/or transmission (Tx) is local to the device.

In another configuration (e.g., mobile hotspot), the cellular band modem 310 may be used to operate as an LTE UE and the open band modem 320 may be used to operate as a Wi-Fi AP (i.e., with concurrency allowing for the Wi-Fi device to operate as both an AP and an STA). In this configuration, the Wi-Fi AP has time-critical downlink (e.g., target beacon transmission time (TBTT), CAB) in order to avoid impact on the basis service set (BSS). The Wi-Fi AP is not "self-peer" whereas the LTE UE is still "self-peer," although it uses a paid frequency band with possible critical traffic (e.g., voice, 911).

In another configuration (e.g., home femto cells), the cellular band modem 310 may be used to operate as an LTE eNodeB and the open band modem 320 may be used to operate as a Wi-Fi AP. In this configuration, both devices may have time-critical downlinks. However, both devices may be able to control their own uplink/downlink grants in order to avoid interference.

Each of the configurations described above with respect to FIG. 3 and in connection with the general architecture of the multi-radio wireless terminal 115-b may be used to perform the LTE/Wi-Fi coexistence mechanisms described herein, including sending a message or request to an AP or similar network device to change channels within a Wi-Fi band to reduce or avoid interference between co-located devices.

Figure 4:
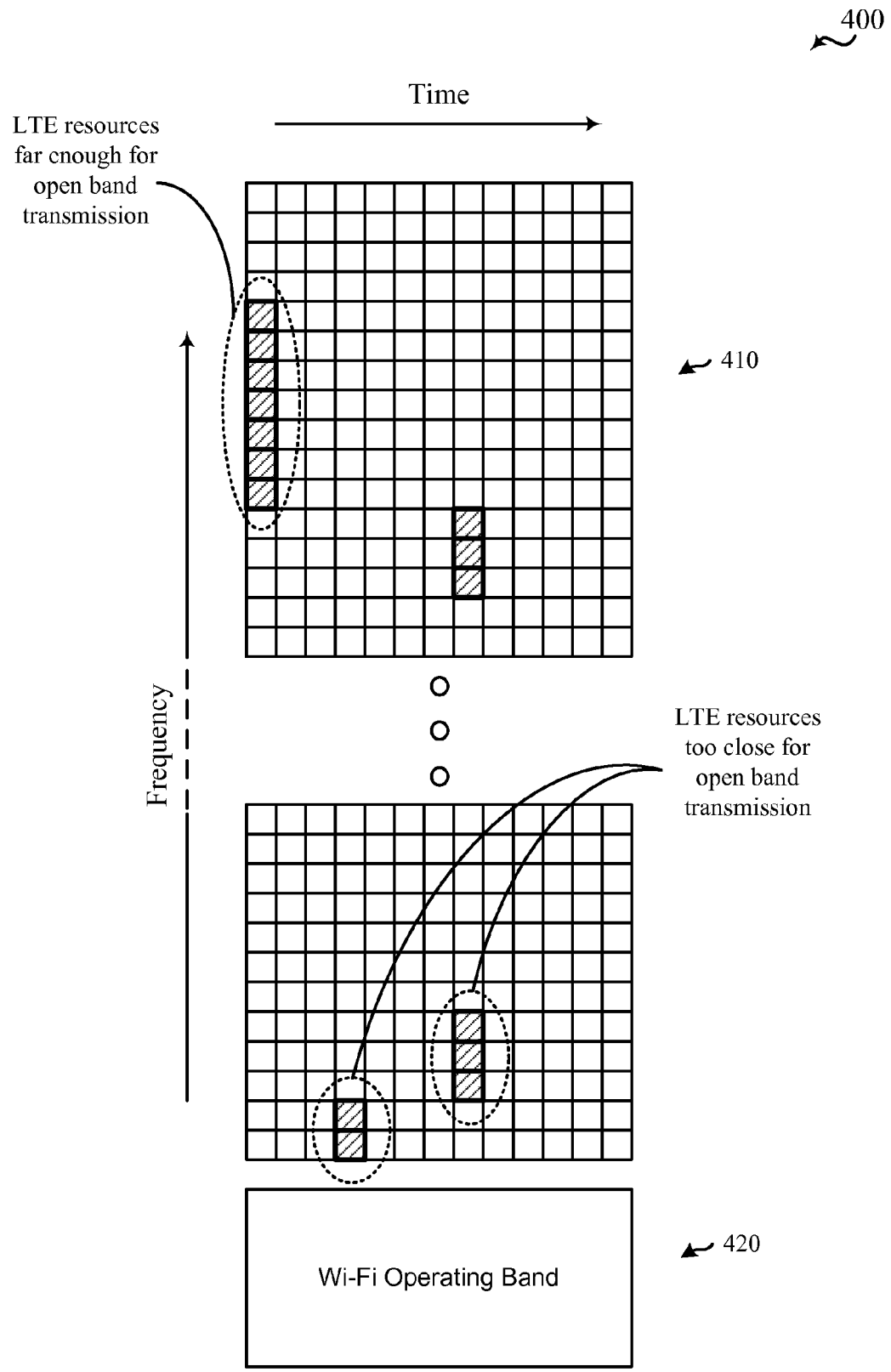
FIG. 4 shows a diagram that illustrates examples of LTE resources interfering with the Wi-Fi operating band according to various embodiments.

FIG. 4 shows a diagram 400 that illustrates examples of LTE resources interfering with a Wi-Fi operating band according to various embodiments. In FIG. 4, LTE resources (e.g., resource blocks or RBs) 410 are allocated over frequency and time as shown. Also shown is a Wi-Fi operating band 420 that represents the frequencies (and channel) at which various wireless terminals (e.g., STAs) are camping. When the LTE resources (i.e., LTE carrier frequency and bandwidth (20 MHz)), are sufficiently apart from the Wi-Fi operating band 420, the transmission in the open band (i.e., Wi-Fi transmissions over ISM band) may be performed without any interference. On the other hand, when the LTE resources are close to or overlap the Wi-Fi operating band 420, then severe interference may be caused to the Wi-Fi communication by LTE. In order to eliminate, reduce, or remove this kind of interference, the following approach may be implemented.

As described above, the CSA IE may be used to indicate a channel switch because of the presence of radar signals in a current channel. The CSA IE, however, may be used more generally to indicate a switch when such a switch may relieve a wireless terminal or a group of terminals of interference being caused by, for example, LTE. The use of CSA IE is typically a prerogative of the AP, that is, the AP initiates the channel switch without any input from the wireless terminals (e.g., STAs). However, by allowing the wireless terminals to send a message (i.e., a reverse channel switch request IE or rCSR IE) to the AP, the AP may use information in that message to make a determination of whether to switch channels to better handle interference issues faced by the wireless stations. The rCSR IE may use a provision of a new UMAC protocol such that associated terminals may report to an AP a need for a change of channel and/or a severity of the LTE interference by using one or more parameters. To use such approach, both the stations that are configured to send the messages and the AP that receives the messages and makes the determination of a channel switch, may need to be compatible such that the message is properly interpreted and handled by the AP. In this regard, deployed stations and APs of a same manufacturer (i.e., of a same type) may be able to implement the rCSR IE or a similar message or request as a vendor-specified IE, for example.

The rCSR IE may include information as to the severity of the LTE interference. For example, various interference parameters may be included such as PER, SNR drop, LTE signal power in the receiver (e.g., RSRP, RSSI) or in the transmitter (e.g., PUCCH and PUSCH power). The LTE power is quasi static in nature and guided by L3 signaling (e.g., radio resource control or RRC) and can be retrieved on the Wi-Fi side of a wireless terminal over slow signaling. A vector including one or more of the parameters described above may be exchanged with an AP for the AP to make the appropriate judgment. Such a vector may be part of the rCSR IE, for example.

In some embodiments, the wireless terminal may also provide to the compatible AP (i.e., same manufacturer or type) a vector of Wi-Fi center frequencies where the level of interference is low. The AP may use this information, as well as other information provided by the wireless terminal(s), to determine whether a channel change is needed and which channel to use in case a change is to take place. The wireless terminal may, optionally, perform periodic spectral scans to determine better center frequencies that have reduced interference. The wireless terminal may then send a request or message (e.g., rCSR IE) to the AP to change the channel to a different channel in one of the better center frequencies.

Upon receiving the rCSR IE from one or more wireless terminals, the AP (e.g., AP 120) may be configured to identify the number of wireless stations that send the channel switch request and proceed with a channel switch when that number is greater than a threshold. In some instances, the AP may make such determination based on the percentage of wireless stations experiencing some level of interference as indicated by the channel switch requests received. The AP may also be configured to identify an interference amount from the rCSR IEs received and proceed with a channel switch when that interference amount is greater than a threshold. For example, the AP may use one or more parameters (e.g., PER, SNR, RSRP, RSSI, PUCCH and PUSCH power) from one or more wireless stations to determine an interference value and to compare that interference value with a threshold. In some embodiments, the AP may use a combination of the number or percentages of wireless stations sending rCSR IEs and the interference amount provided in those rCSR IEs to determine whether a channel switch is appropriate to relieve the wireless stations from interference.

Other combinations are also possible with respect to features or functions that the AP may be configured to support. For example, the AP upon receiving rCSR IE from a set of N wireless terminals or stations, the AP may determine to move a subset M into a mitigated interference channel such that the M wireless terminals assist in proper group formation for downlink multi-user (MU) multiple-input multiple-output (MIMO) communications thereby enhancing overall system capacity. In another example, the AP may determine to move to the mitigated interference channel a subset M of wireless terminals that have a throughput category (e.g., such as those that are IEEE 9802.11ac compliant) that is higher than a threshold value, have a higher number of receive/transmit (Rx/Tx) antenna chains than a threshold value, and/or have been operating at a modulation and coding scheme (MCS) rate that is higher than a threshold value. With this approach, the performance of wireless terminals that are operating at a high level of performance can be improved. Another approach may be to determine a subset M of wireless terminals that are performing poorly (e.g., certain parameters such as throughput, Rx/Tx antenna chains, and/or MCS rate below a threshold value). This subset may be moved to the mitigated interference channel to provide a cleaner environment so that the level of services available to these wireless terminals can be improved to the level of other wireless terminals pertaining to the same manufacturer.

When the AP determines that a channel switch is appropriate, it may send or transmit a modified CSA IE or mCSA, or some form of proprietary UMAC signaling, to those associated terminals that are of the same type as the AP (i.e., same vendor or manufacturer) to indicate the channel switch. In this case, the AP may spawn off a new AP virtual device (VDEV) for the new channel and service the associated terminals in that channel. All other associated terminals that are to remain in a current channel (because they are of a different type as the AP) may continue to use an existing AP VDEV in the current channel. In some instances, the AP may determine that all associated terminals, including those of a different type (i.e., a different vendor or manufacturer), need to be changed to a new channel. In this case, the AP may send or transmit a modified CSA IE, or some form of proprietary UMAC signaling, to all the associated terminals regardless of terminal type to indicate the channel switch.

Figure 5:
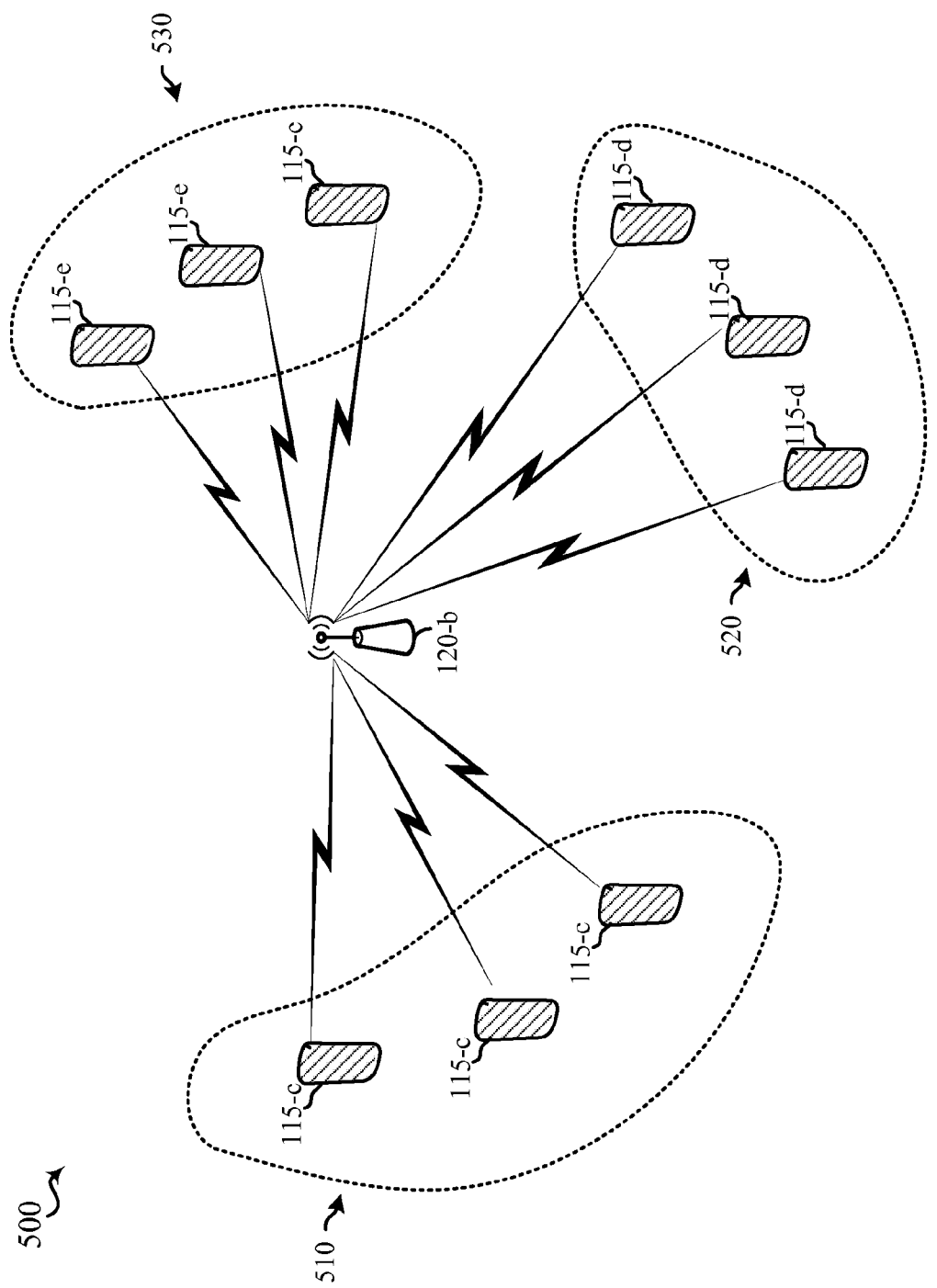
FIG. 5 shows a diagram that illustrates examples of types of wireless terminals according to various embodiments.

FIG. 5 shows a diagram 500 that includes an AP 120-b, a first set 510 of stations or wireless terminals 115-c of a first type, a second set 520 of stations or wireless terminals 115-d of a second type, and a third set 530 of stations or wireless terminals 115-e of a third type. The AP 120-b may be an example of the AP 120s of FIG. 1 and FIG. 2. The wireless terminals 115-c, 115-d, and 115-c may be examples of the wireless devices 115 in FIG. 1, FIG. 2, and FIG. 3. The AP 120-b may be of the same type as the wireless terminals 115-c, that is, the AP 120-b and the wireless terminals 115-c may be compatible and configured to support the use of a vendor-specified rCSR IE for reverse channel switch requests. Typically, the AP 120-b and the wireless terminals 115-c may be compatible because they have a common vendor or manufacturer that supports the use of rCSR IE for reverse channel switch requests. In other instances, the AP 120-b and the wireless terminals 115-c may be configured into compatibility, even when having different vendors or manufacturers, by allowing the implementation of rCSR IE or some other similar message for reverse channel switch requests.

In the example shown in FIG. 5, the AP 120-b may receive messages (e.g., rCSR IEs) from a subset of the wireless terminals 115-c in the first set 510. The AP 120-b may identify the number of wireless terminals 115-c sending the messages and/or interference amount information included in the messages. Then, the AP 120-b may determine whether to switch the current channel being used by wireless terminals in the first set 510 to a different channel. If the AP 120-b determines that a channel switch is appropriate (e.g., number/percentage of wireless terminals 115-c in the first set 510 is greater than a threshold), then the AP 120-b may send or transmit a modified CSA IE to the wireless terminals 115-c in the first set 510 to indicate a change to a different channel for all of the wireless terminals in the set. The AP 120-b may then spawn off a new AP VDEV to handle the new channel and switch the wireless terminals in the first set 510 to this new channel. The wireless terminals in the second set 520 and in the third set 530 may remain in the current channel (and in the current AP VDEV) and are not switched to the new channel by the AP 120-b.

In some instances, although not typically, the AP 120-b may switch a subset (in some cases as few as one) of the wireless terminals in the first set 510 to the new channel and keep the remaining wireless terminals in the first set 510 (as well as the wireless terminals in the second set 520 and the third set 530) in the current or old channel.

In other instances, the AP 120-b may decide that it is appropriate or beneficial to change all of the wireless stations, including those of a different type (e.g., second set 520, third set 530) to a different or new channel in response to the requests made by wireless stations in the first set 510. In those cases, the AP 120-b may send or transmit a CSA IE to all the associated wireless stations to indicate a change or switch to a different channel. The AP 120-b may then spawn off a new AP VDEV to handle the new channel and switch all of the wireless terminals in the first set 510, the second set 520, and the third set 530 to this new channel.

For example, the AP 120-b may move all of the wireless terminals into a mitigated interference channel such that the wireless terminals assist in proper group formation for downlink MU MIMO communications thereby enhancing overall system capacity. The AP 120-b may evaluate various factors to determine when it is appropriate to move all of the wireless terminals into a mitigated interference channel. For example, the AP 120-b may move all of the wireless terminals when a determination is made that such a move will provide an overall improvement in throughput and/or MCS rate, and/or when such a move will provide all of the wireless terminals with a cleaner environment so that the level of services available to the wireless terminals can be substantially similar even for wireless terminals of different manufacturers.

Figure 6:
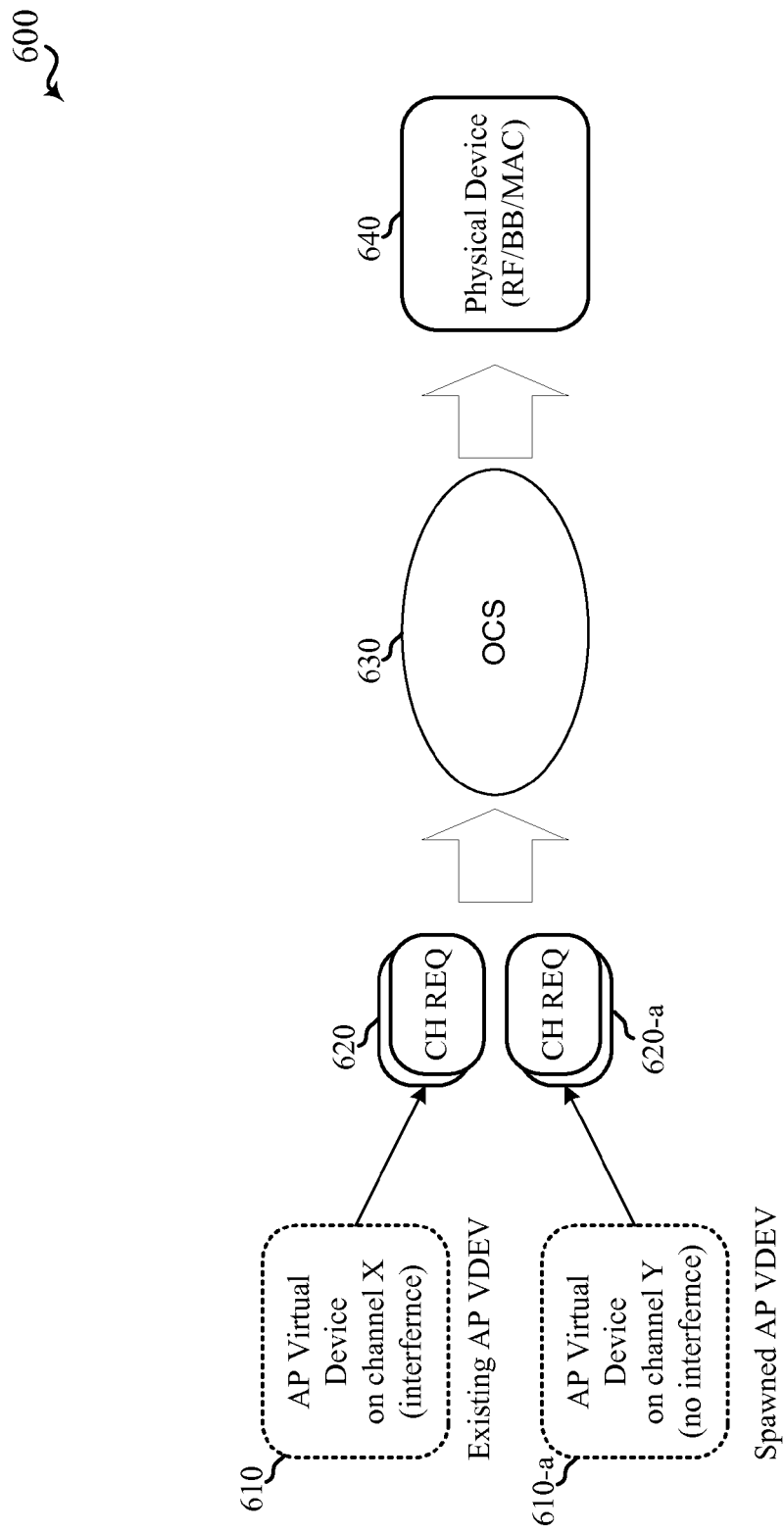
FIG. 6 shows a block diagram that illustrates examples of virtual devices in an AP according to various embodiments.

FIG. 6 shows a diagram 600 that illustrates examples of virtual devices in an AP according to various embodiments. Diagram 600 may correspond to an AP (e.g., AP 120) that may operate in a virtual concurrency mode in which there is a current or existing AP virtual device 610 on channel X (i.e., the current channel with LTE interference) used for associated wireless stations. When a channel switch is to take place, the AP may spawn a separate AP virtual device 610-a for channel Y (i.e., the different or new channel without LTE interference). The wireless terminals that are to be switched (i.e., those compatible with or of the same type as the AP) may then be moved or pushed to the AP virtual device 610-a. The selection of channel Y may be based on, for example, the LTE center frequency reported by the various wireless terminals through their respective rCSR IE message and/or a desired or preferred band isolation that may guarantee or provide a particular throughput.

The AP may toggle between channel X and channel Y by performing a clear-to-send-to-self (CTS2S) or Quiet IE procedure on each of the AP VDEV's basic service set (BSS). For example, when using channel X for those wireless stations that were not switched, the AP may request that the wireless stations in channel Y remain silent for the period of time that channel X is being served. The AP may communicate with the wireless stations in channel X during this period of time through a channel request 620, an OCS 630, and a physical device 640 (with radio frequency (RF), baseband (BB), and MAC layer resources). When using channel Y for those wireless stations that were switched, the AP may request that the wireless stations in channel X remain silent for the period of time that channel Y is being served. The AP may communicate with the wireless stations in channel Y during this period of time through a channel request 620-a, the OCS 630, and the physical device 640.

In some instances, the AP and the associated wireless terminals may support single band simultaneous or SBS. In SBS, it may be possible to operate in two frequencies (e.g., f1 and f2) in the same band using a single physical device (e.g., physical device 640). The SBS mechanism may allow a deployment of an AP and associated wireless terminals of the same type to operate in two frequencies and have the wireless terminals request a change or switch from one frequency that is experiencing higher LTE interference to the other frequency. Since both frequencies are supported at the same time, virtual devices used for the different frequencies need not be toggled as described above and may instead be operated concurrently.

Figure 7A:
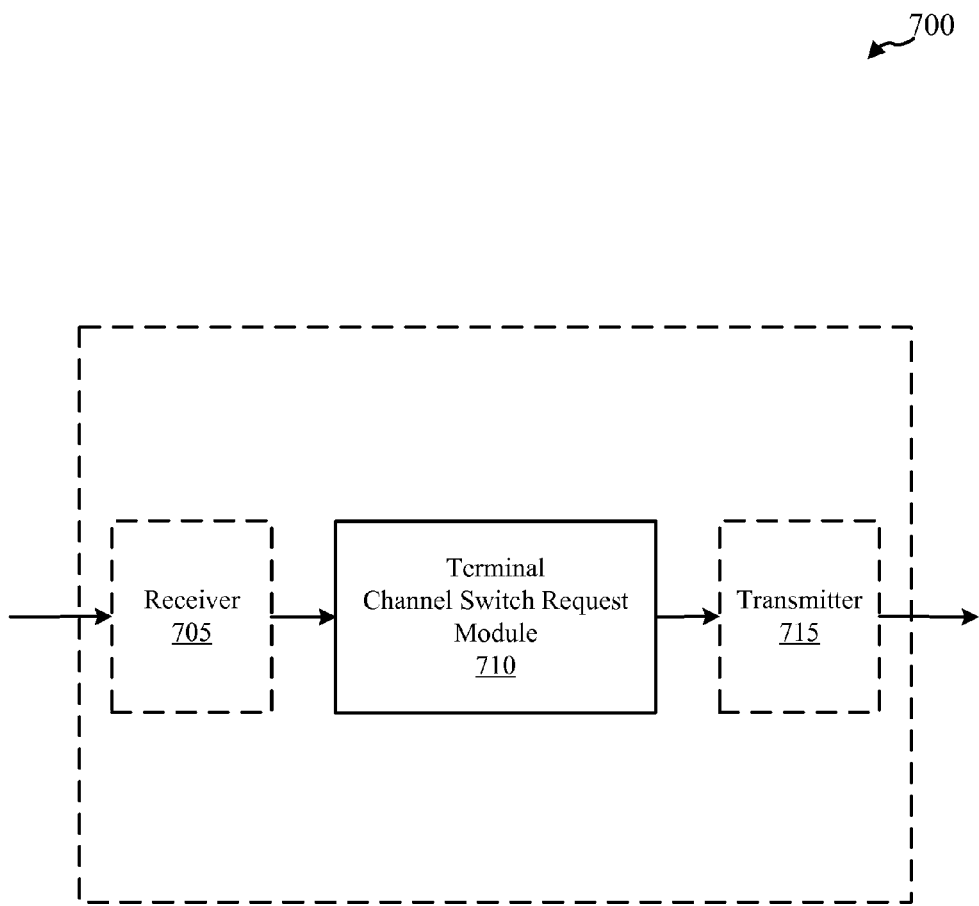
FIG. 7A shows a block diagram that illustrates an example of a device for reverse channel switch request (e.g., at a wireless terminal) according to various embodiments.

FIG. 7A shows a device 700 for use in wireless communications coexistence according to various embodiments. In some embodiments, the device 700 may be an example of one or more aspects of one of the UEs, STAs, or wireless terminals 115 described with reference to FIG. 1, FIG. 2, FIG. 3, and/or FIG. 5. The device 700 may be an example of a multi-radio wireless terminal such the multi-radio wireless terminal 115-*b* in FIG. 3. The device 700, or portions of it, may also be a processor. The device 700 may include a receiver 705, a terminal channel switch request module 710, and/or a transmitter 715. Each of these components may be in communication with each other.

The components of the device 700 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs. Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 705 may be or include an RF receiver. The RF receiver may include separate receivers for the different bands. For example, the RF receiver may include a receiver (i.e., part of a radio or modem) operable to receive transmissions in one or more Wi-Fi bands (e.g., 2.4 GHz, 5 GHz). The RF receiver may also include a receiver operable to receive transmission in one or more LTE bands. The receiver 705 may be used to receive various types of data and/or control signals (i.e., transmissions) over one or more communication links of a wireless communications system, such as one or more communication links of the cellular networks (e.g., LTE networks) and/or the WLAN or Wi-Fi networks described with reference to FIG. 1, FIG. 2, and/or FIG. 5.

In some embodiments, the transmitter 715 may be or include an RF transmitter. The RF transmitter may include separate transmitters for the different bands. For example, the RF transmitter may include a transmitter (i.e., part of a radio or modem) operable to transmit in one or more Wi-Fi bands (e.g., 2.4 GHz, 5 GHz). The RF transmitter may also include a transmitter operable to transmit in one or more LTE bands. The transmitter 715 may be used to transmit various types of data and/or control signals (i.e., transmissions) over one or more communication links of a wireless communications system, such as one or more communication links of the cellular networks (e.g., LTE networks) and/or the WLAN or Wi-Fi networks described with reference to FIG. 1, FIG. 2, and/or FIG. 5.

In some embodiments, the terminal channel switch request module 710 is configured to detect an interference produced on a first device (e.g., Wi-Fi radio or modem) by a second device (e.g., LTE radio or modem) co-located with the first device. The first device may be configured to wirelessly communicate with an associated access point (AP) using an open band (e.g., ISM band), and the second device may be configured to wirelessly communicate with a cellular network (e.g., LTE network). The terminal channel switch request module 710 and/or the transmitter 715 are configured to transmit a message (e.g., rCSR IE) to the associated AP in response to the detected interference. The message includes information for the associated AP to determine whether to switch to a different channel in the open band to communicate with the first device. The associated AP may also identify an appropriate channel for the switch based at least in part on the information included in the message.

The information in the message may include a request that the associated AP communicate with the first device using a different channel in the open band, one or more parameters associated with the detected interference, or both. The one or more parameters may include one or more of a packet error rate of the first device, a signal-to-noise ratio drop of the first device, and a transmission signal power of the second device. As noted above, the parameters may also include information about the LTE carrier frequencies causing the interference on the first device.

In some embodiments, the terminal channel switch request module 710 and/or the receiver 705 are configured to receive in response to the message transmitted to the associated AP, a message (e.g., modified CSA IE) from the associated AP indicating a switch to a different channel in the open band for communication with the first device. The terminal channel switch request module 710 is further configured to switch operation of the first device to the different channel in the open band in response to the message received from the associated AP.

Figure 7B:
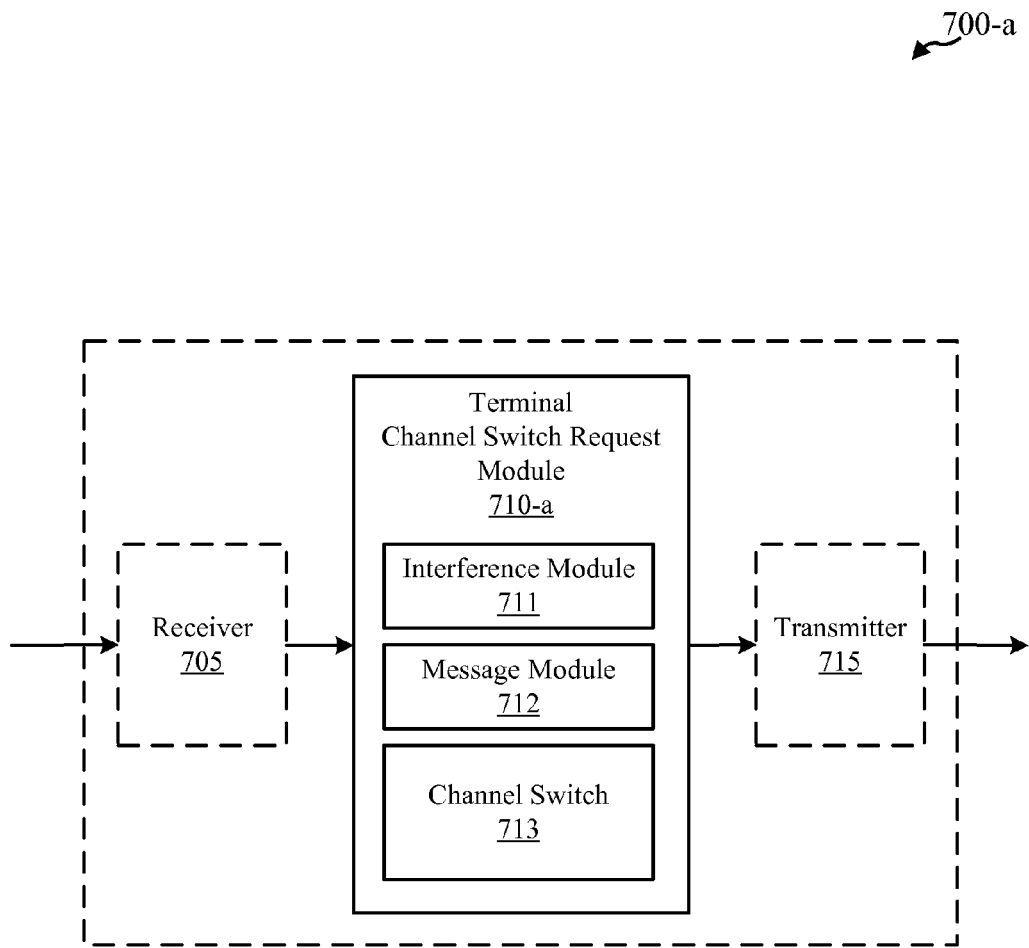
FIG. 7B shows a block diagram that illustrates another example of a device for reverse channel switch request (e.g., at a wireless terminal) according to various embodiments.

FIG. 7B shows a device 700-*a* for use in wireless communications coexistence according to various embodiments. In some embodiments, the device 700-*a* may be an example of the device 700 of FIG. 7A. The device 700-*a*, or portions of it, may also be a processor. The device 700-*a* may include the receiver 705, a terminal channel switch request module 710-*a*, and/or the transmitter 715. Each of these components may be in communication with each other.

The components of the device 700-*a* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 705 and the transmitter 715 are described above with respect to FIG. 7A. The terminal channel switch request module 710-*a* may be an example of the terminal channel switch request module 710 of FIG. 7A, and may include an interference module 711, a message module 712, and a channel switch 713. Each of these components may be in communication with each other.

The interference module 711 may handle aspects described at least with respect to FIG. 1, FIG. 2, FIG. 3, FIG. 4, FIG. 5, and/or FIG. 6 related to detecting, identifying, analyzing, and/or processing interference information and/or interference parameters that indicate interference in one radio or modem by a co-located radio or modem. The message module 712 may handle aspects described at least with respect to FIG. 1, FIG. 2, FIG. 3, FIG. 4, FIG. 5, and/or FIG. 6 related to generating and/or transmitting messages (e.g., rCSR IEs) to an AP (e.g., AP 120), as well as receiving and/or processing messages (e.g., modified CSA IEs) from the AP. The channel switch 713 may handle aspects described at least with respect to FIG. 1, FIG. 2, FIG. 3, FIG. 4, FIG. 5, and/or FIG. 6 related to switching from operating in a current channel to operating in a different or new channel in response to one or more messages provided by an AP.

Figure 8A:
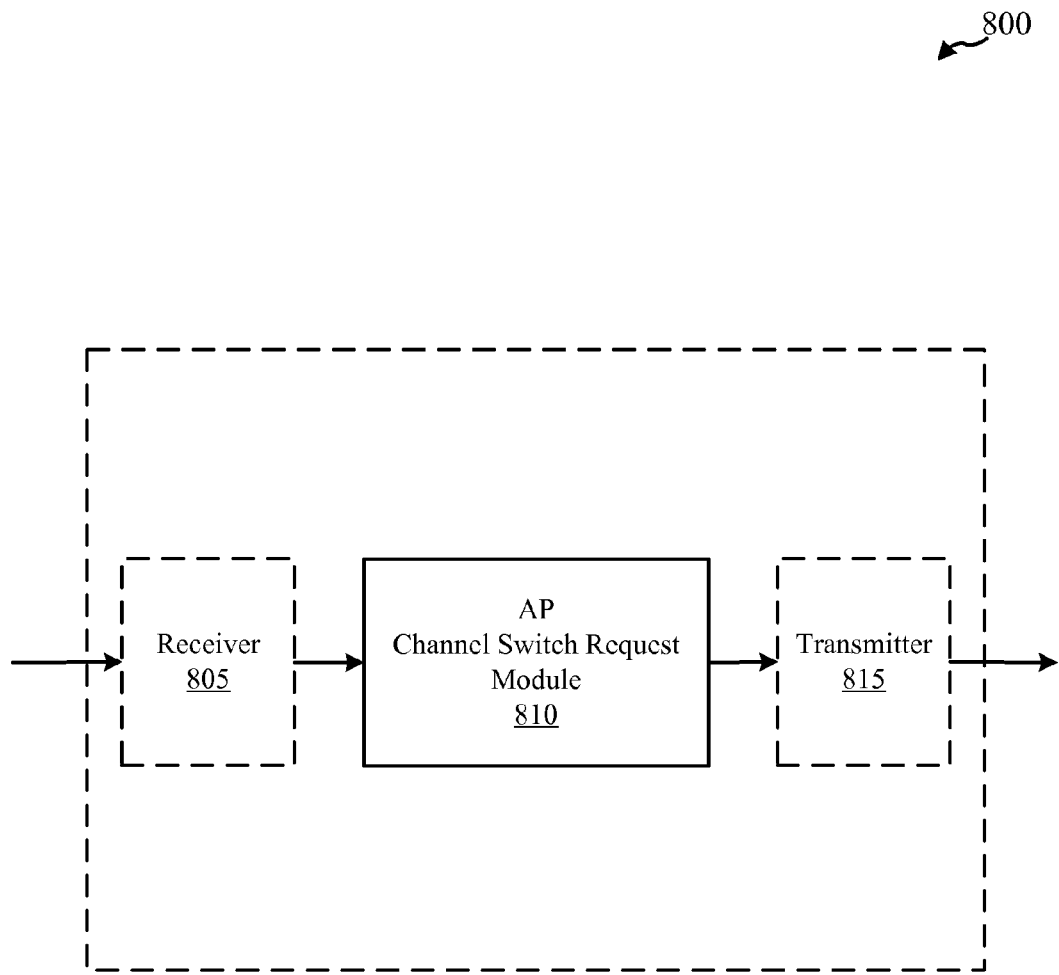
FIG. 8A shows a block diagram that illustrates an example of a device for reverse channel switch request (e.g., at an AP) according to various embodiments.

FIG. 8A shows a device 800 for use in wireless communications coexistence according to various embodiments. In some embodiments, the device 800 may be an example of one or more aspects of one of the APs 120 described with reference to FIG. 1, FIG. 2, FIG. 5, and/or FIG. 6. The device 800, or portions of it, may also be a processor. The device 800 may include a receiver 805, an AP channel switch request module 810, and/or a transmitter 815. Each of these components may be in communication with each other.

The components of the device 800 may, individually or collectively, be implemented with one or ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 805 may be or include an RF receiver. The RF receiver may include separate receivers for the different bands. For example, the RF receiver may include a receiver (i.e., part of a radio or modem) operable to receive transmissions in one or more Wi-Fi bands (e.g., 2.4 GHz, 5 GHz). The receiver 805 may be used to receive various types of data and/or control signals (i.e., transmissions) over one or more communication links of a wireless communications system, such as one or more communication links of WLAN or Wi-Fi networks described with reference to FIG. 1, FIG. 2, and/or FIG. 5.

In some embodiments, the transmitter 815 may be or include an RF transmitter. The RF transmitter may include separate transmitters for the different bands. For example, the RF transmitter may include a transmitter (i.e., part of a radio or modem) operable to transmit in one or more Wi-Fi bands (e.g., 2.4 GHz, 5 GHz). The transmitter 815 may be used to transmit various types of data and/or control signals (i.e., transmissions) over one or more communication links of a wireless communications system, such as one or more communication links of the WLAN or Wi-Fi networks described with reference to FIG. 1, FIG. 2, and/or FIG. 5.

In some embodiments, the AP channel switch request module 810 and/or the receiver 805 are configured to receive from each terminal in at least a subset of associated terminals (e.g., first set 510) a message (e.g., rCSR IE) including information to determine whether to switch to a different channel in an open band to communicate with the associated terminals. The AP channel switch request module 810 and/or the transmitter 815 are configured to transmit a message (e.g., modified CSA IE) to the associated terminals indicating a switch to the different channel in the open band. The AP channel switch request module 810 is further configured to switch to the different channel in the open band to communicate with the associated terminals.

In some embodiments, the associated terminals are of a first type and additional associated terminals are of a second type. The AP channel switch request module 810 and/or the transmitter 815 are configured to transmit a message (e.g., modified CSA IE) to the additional associated terminals indicating a switch to the different channel in the open band. The AP channel switch request module 810 is configured to then switch to the different channel in the open band to communicate with the associated terminals and with the additional associated terminals. The first type of terminals may include terminals having a modem device from a first vendor (or manufacturer) for communication in the open band, and the second type of terminals may include terminals having a modem device from a second vendor (or manufacturer) for communication in the open band.

In some embodiments, the associated terminals are of a first type and additional associated terminals are of a second type. The AP channel switch request module 810 is configured to maintain a current channel in the open band to communicate with the additional associated terminals while switching to the different channel in the open band to communicate with the associated terminals. Maintaining the current channel in the open band to communicate with the additional associated terminals may involve maintaining the additional associated terminals in a virtual device for the current channel (e.g., AP VDEV 610), and switching to the different channel in the open band to communicate with the associated terminals may involve spawning a separate virtual device for the different channel (e.g., AP VDEV 610-a).

In some embodiments, the AP channel switch request module 810 is configured to identify a number of terminals transmitting the message and to determine whether to switch to the different channel based at least in part on the number of terminals transmitting the message. In some cases, determining whether to switch to the different channel may involve determining whether the number of terminals transmitting the message is greater than a threshold value.

In some embodiments, the AP channel switch request module 810 is configured to identify an interference parameter corresponding to each of the terminals transmitting the message, and to determine whether to switch to the different channel based at least in part on the interference parameter corresponding to each of the terminals transmitting the message. In some cases, determining whether to switch to the different channel may involve determining whether a combination of the interference parameter corresponding to each of the terminals transmitting the message produces an interference value greater than a threshold value. The interference parameter may include one or more of a PER of a first device (e.g., Wi-Fi radio or modem) in the terminal affected by the interference, an SNR of the first device, and a transmission signal power (e.g., RSRP, RSSI, PUCCH and PUSCH power) of a second device (e.g., LTE radio or modem) in the terminal causing the interference on the first device.

Figure 8B:
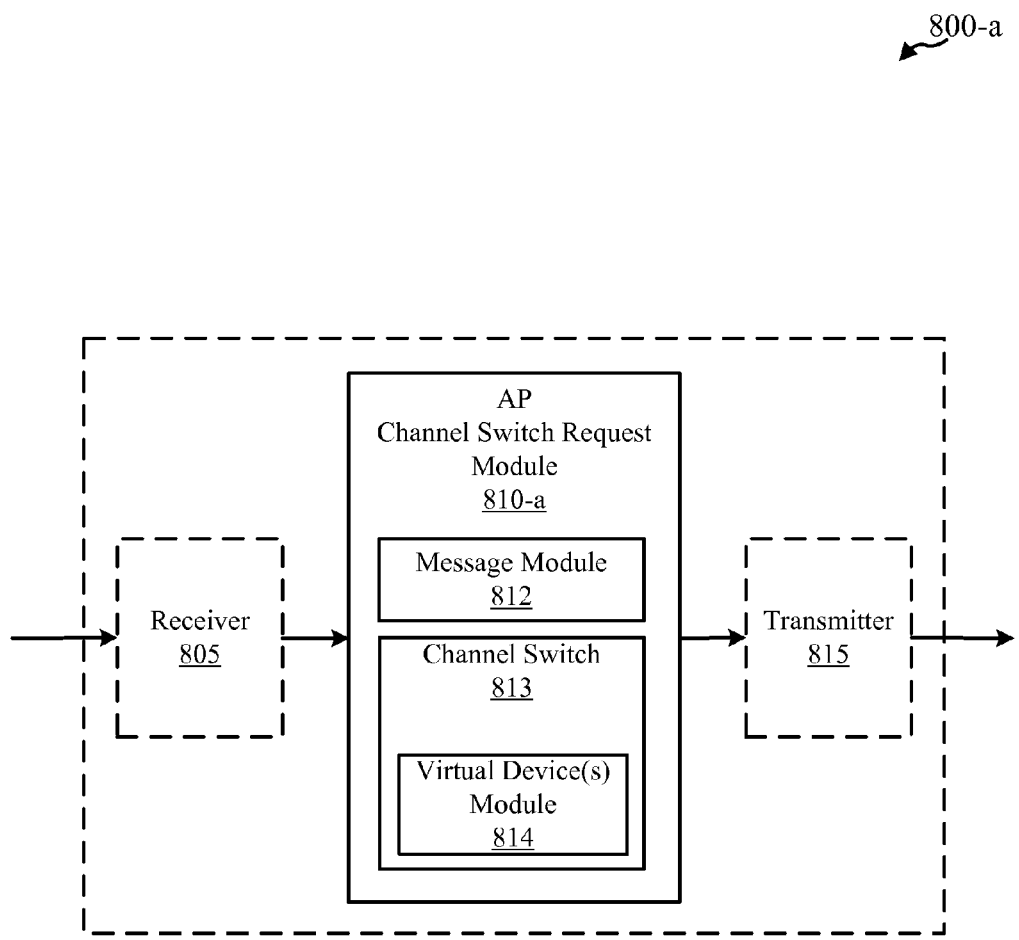
FIG. 8B shows a block diagram that illustrates another example of a device for reverse channel switch request (e.g., at an AP) according to various embodiments.

FIG. 8B shows a device 800-a for use in wireless communications coexistence according to various embodiments. In some embodiments, the device 800-a may be an example of the device 800 of FIG. 8A. The device 800-a, or portions of it, may also be a processor. The device 800-a may include the receiver 805, an AP channel switch request module 810-a, and/or the transmitter 815. Each of these components may be in communication with each other.

The components of the device 800-a may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 805 and the transmitter 815 are described above with respect to FIG. 8A. The AP channel switch request module 810-*a* may be an example of the AP channel switch request module 810 of FIG. 8A, and may include a message module 812 and a channel switch 813, which in turn may include a virtual device(s) module 814. Each of these components may be in communication with each other.

The message module 812 may handle aspects described at least with respect to FIG. 1, FIG. 2, FIG. 3, FIG. 4, FIG. 5, and/or FIG. 6 related to receiving and/or processing messages (e.g., rCSR IEs) from at least one associated wireless terminal that is compatible or of a similar type, as well as generating and/or transmitting messages (e.g., modified CSA IEs) to associated wireless terminals, both of the same type and of a different type when appropriate. The channel switch 813 may handle aspects described at least with respect to FIG. 1, FIG. 2, FIG. 3, FIG. 4, FIG. 5, and/or FIG. 6 related to switching from operating in a current channel to operating in a different or new channel in response to one or more messages provided by associated wireless terminals. The virtual device(s) module 814 may handle aspects described at least with respect to FIG. 6 related to using virtual devices (e.g., AP VDEV 610, 610-*a*) when switch at least some wireless terminals from operating in a current channel to operating in a different or new channel.

Figure 9:
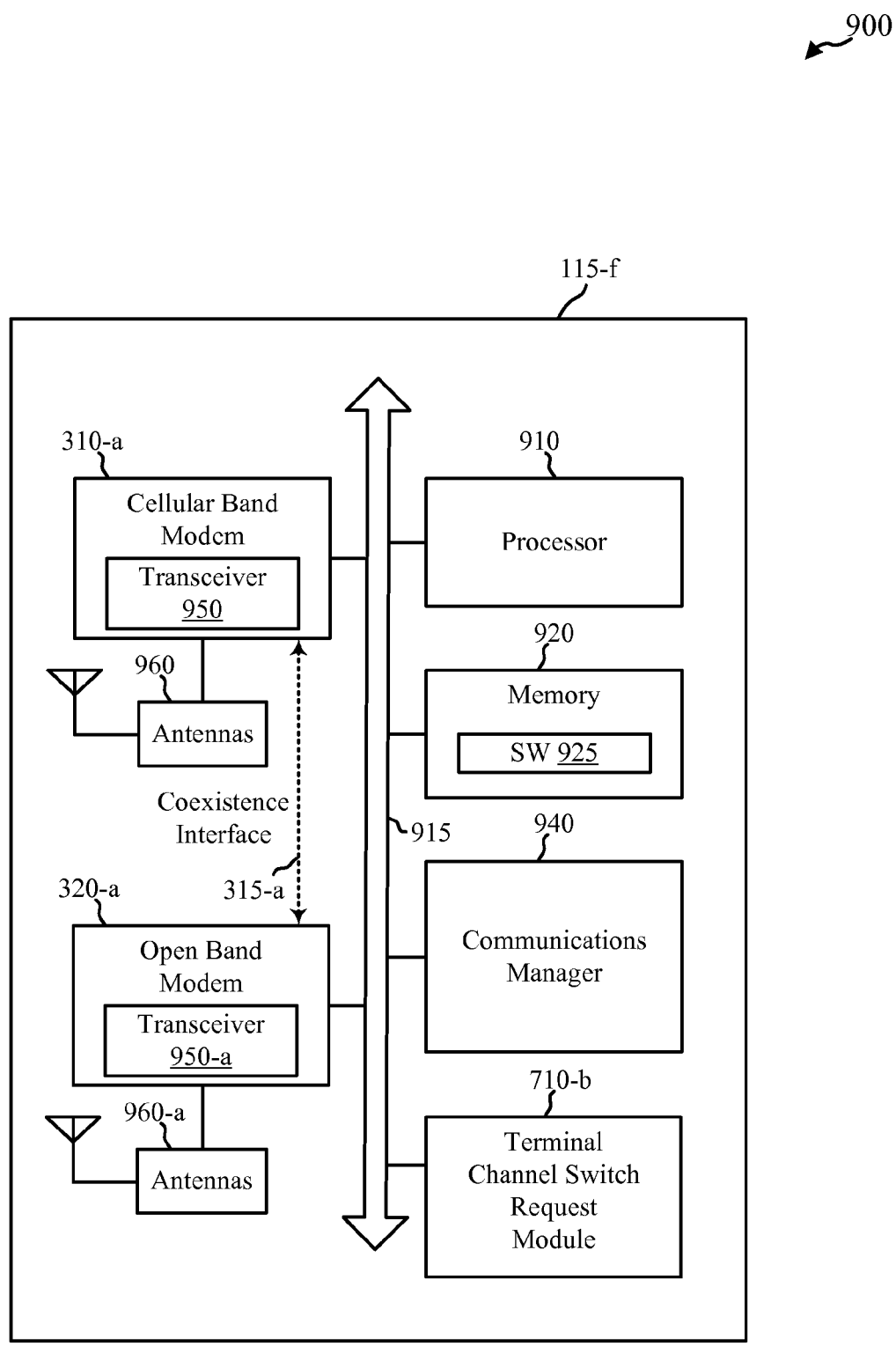
FIG. 9 shows a block diagram that illustrates an example of a wireless device or wireless terminal architecture according to various embodiments.

FIG. 9 shows a diagram 900 that illustrates a wireless terminal 115-*f* configured for handling LTE/Wi-Fi coexistence interference. The wireless terminal 115-*f* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless terminal 115-*f* may have an internal power supply (not shown), such as a small battery, to facilitate mobile operation. The wireless terminal 115-*f* may be an example of the UEs, STAs, and wireless terminals 115 of FIG. 1, FIG. 2, FIG. 3, and FIG. 5. The wireless terminal 115-*f* may be configured to implement at least some of the features and functions described above with respect to FIGS. 1-7B.

The wireless terminal 115-*f* may include a processor 910, a memory 920, a cellular band modem 310-*a*, an open band modem 320-*a*, antennas 960 and 960-*a*, and a terminal channel switch request module 710-*b*. The cellular band modem 310-*a* may be an example of the cellular band modem 310 of FIG. 3. The open band modem 320-*a* may be an example of the open band modem 320 of FIG. 3. Moreover, the terminal channel switch request module 710-*b* may be an example of similar modules in FIG. 7A and FIG. 7B. Each of these components may be in communication with each other, directly or indirectly, over one or more buses 915. In addition, the cellular band modem 310-*a* and the open band modem 320-*a* may have a coexistence interface 315-*a*, which in some instances may be implemented over the one or more buses 915. The coexistence interface 315-*a* may be an example of the coexistence interference 315 of FIG. 3.

The memory 920 may include random access memory (RAM) and read-only memory (ROM). The memory 920 may store computer-readable, computer-executable software (SW) code 925 containing instructions that are configured to, when executed, cause the processor 910 to perform various functions described herein for handling LTE/Wi-Fi coexistence interference at a wireless terminal. Alternatively, the software code 925 may not be directly executable by the processor 910 but be configured to cause the computer (e.g., when compiled and executed) to perform functions described herein.

The processor 910 may include an intelligent hardware device, e.g., a central processing unit (CPU), a microcontroller, an ASIC, etc. The processor 910 may process information received through transceivers 950 and 950-*a* in the cellular band modem 310-*a* and the open band module 320-*a*, respectively. The processor 910 may process information to be sent to the transceivers 950 and 950-*a* for transmission through the antennas 960 and 960-*a*, respectively. The processor 910 may handle, alone or in connection with the terminal channel switch request module 710-*b*, various aspects of handling LTE/Wi-Fi coexistence interference at a wireless terminal.

The transceiver 950 may be configured to communicate bi-directionally with base stations (e.g., base stations 105). The transceiver 950 may be implemented as one or more transmitters and one or more separate receivers. The transceiver 950 may support communications with an LTE network. The transceiver 950 may include a modem configured to modulate the packets and provide the modulated packets to the antennas 960 for transmission, and to demodulate packets received from the antennas 960.

The transceiver 950-*a* may be configured to communicate bi-directionally with access points (e.g., AP 120). The transceiver 950-*a* may be implemented as one or more transmitters and one or more separate receivers. The transceiver 950-*a* may support communications with a WLAN or Wi-Fi network. The transceiver 950-*a* may include a modem configured to modulate the packets and provide the modulated packets to the antennas 960-*a* for transmission, and to demodulate packets received from the antennas 960-*a*.

According to the architecture of FIG. 9, the wireless terminal 115-*f* may further include a communications manager 940. The communications manager 940 may manage communications with various base stations and/or access points. The communications manager 940 may be a component of the wireless terminal 115-*f* in communication with some or all of the other components of the wireless terminal 115-*f* over the one or more buses 915. Alternatively, functionality of the communications manager 940 may be implemented as a component of the transceivers 950 and 950-*a*, as a computer program product, and/or as one or more controller elements of the processor 910.

The terminal channel switch request module 710-*b* may be configured to perform various aspects related to interference handling, including the transmission and/or reception of messages (e.g., rCSR IE, modified CSA IE) related to channel switch requests, and/or including the switching of operating channel to avoid LTE or other cellular interference. Moreover, some or all of the functionality of the terminal channel switch request module 710-*b* may be performed by the processor 910 and/or in connection with the processor 910. In some embodiments, some or all of the functionality of the terminal channel switch request module 710-*b* may be implemented as part of the open band modem 320-*a*.

Figure 10:
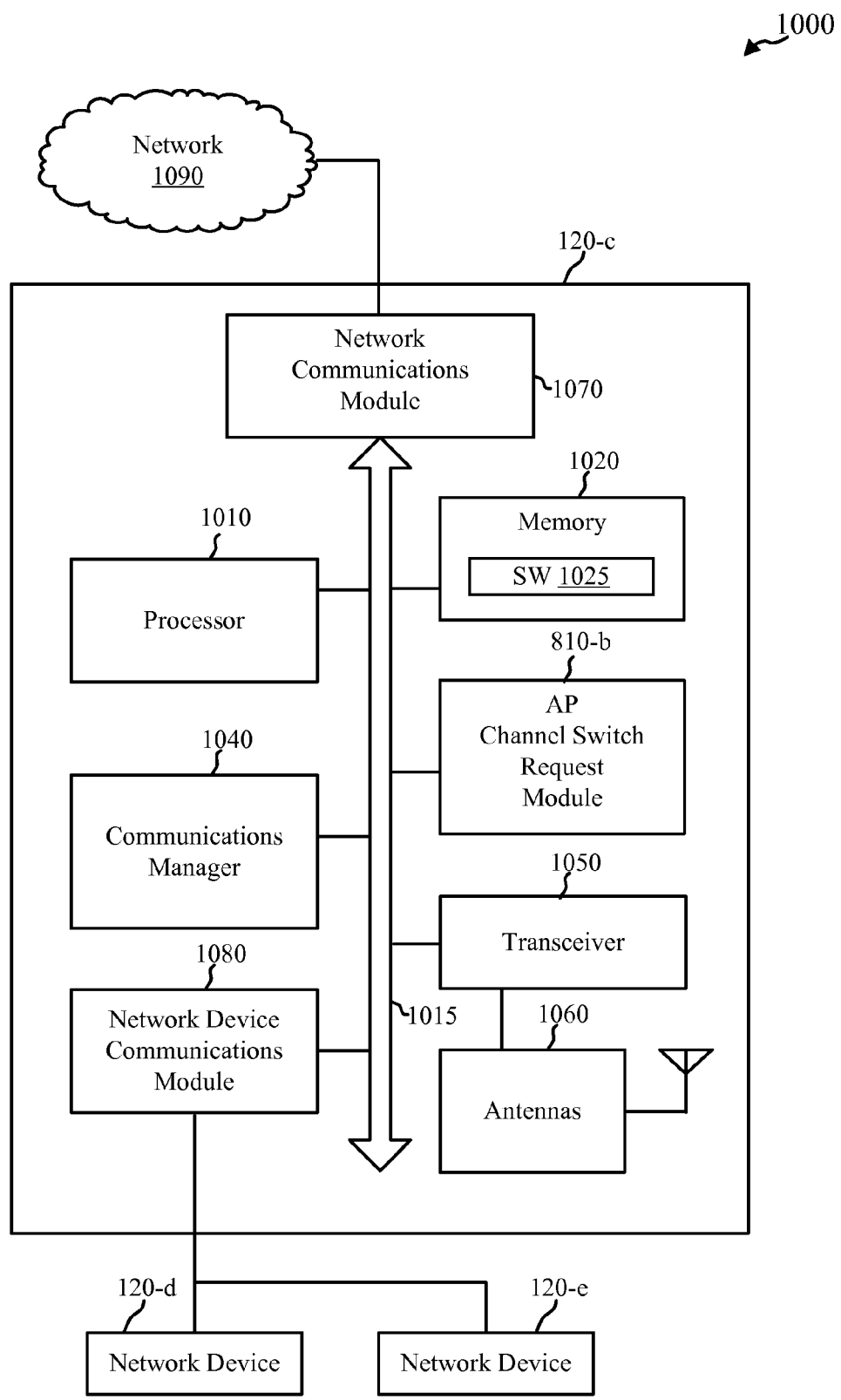
FIG. 10 shows a block diagram that illustrates an example of a network device architecture according to various embodiments.

FIG. 10 shows a diagram 1000 that illustrates an AP 120-*c* configured for handling LTE/Wi-Fi coexistence interference. In some embodiments, the AP 120-*c* may be an example of the APs 120 of FIG. 1, FIG. 2, FIG. 5, and FIG. 6. The AP 120-*c* may be configured to implement at least some of the features and functions described above with respect to FIGS. 1-8B. The AP 120-*c* may include a processor 1010, a memory 1020, a transceiver 1050, antennas 1060, and an AP channel switch request module 810-*b*. The AP 120-*c* may also include one or both of a network device communications module 1080 and a network communications module 1070. The AP channel switch request module 810-*b* may be an example of similar modules in FIG. 8A and FIG. 8B. Each of these components may be in communication with each other, directly or indirectly, over one or more buses 1015.

The memory 1020 may include RAM and ROM. The memory 1020 may also store computer-readable, computer-executable software (SW) code 1025 containing instructions that are configured to, when executed, cause the processor 1010 to perform various functions described herein for handling LTE/Wi-Fi coexistence interference at an AP. Alternatively, the software code 1025 may not be directly executable by the processor 1010 but be configured to cause the computer, e.g., when compiled and executed, to perform functions described herein.

The processor 1010 may include an intelligent hardware device, e.g., a CPU, a microcontroller, an ASIC, etc. The processor 1010 may process information received through the transceiver 1050, the network device communications module 1080, and/or the network communications module 1070. The processor 1010 may also process information to be sent to the transceiver 1050 for transmission through the antennas 1060, to the network device communications module 1080, and/or to the network communications module 1070. The processor 1010 may handle, alone or in connection with the AP channel switch request module 810-*b*, various aspects of handling LTE/Wi-Fi coexistence interference at an AP.

The transceiver 1050 may include a modem configured to modulate the packets and provide the modulated packets to the antennas 1060 for transmission, and to demodulate packets received from the antennas 1060. The transceiver 1050 may be implemented as one or more transmitters and one or more separate receivers. The transceiver 1050 may support communications a free or open band (e.g., ISM or Wi-Fi band). The transceiver 1050 may be configured to communicate bi-directionally, via the antennas 1060, with one or more associated wireless terminals or stations (STAs). The AP 120-*c* may include multiple antennas 1060. The AP 120-*c* may communicate with a network 1090 through the network communications module 1070. In some instances, the network 1090 may be part of a WLAN or Wi-Fi network or may be in communication with the core network 130 of FIG. 1. The AP 120-*c* may communicate with other network devices, such as the APs 120-*d* and 120-*e*, using the network device communications module 1080, the transceiver 1050, and/or the network communications module 1070.

According to the architecture of FIG. 10, the AP 120-*c* may further include a communications manager 1040. The communications manager 1040 may manage communications with wireless devices (e.g., STAs) and/or other network devices. The communications manager 1040 may be in communication with some or all of the other components of the AP 120-*c* via the bus or buses 1015. Alternatively, functionality of the communications manager 1040 may be implemented as a component of the transceiver 1050, as a computer program product, and/or as one or more controller elements of the processor 1010.

The AP channel switch request module 810-*b* may be configured to perform various aspects related to interference handling, including the transmission and/or reception of messages related to channel switch requests, and/or including the switching of operating channel to avoid LTE or other cellular interference. Moreover, some or all of the functionality of the AP channel switch request module 810-*b* may be performed by the processor 1010 and/or in connection with the processor 1010.

Figure 11:
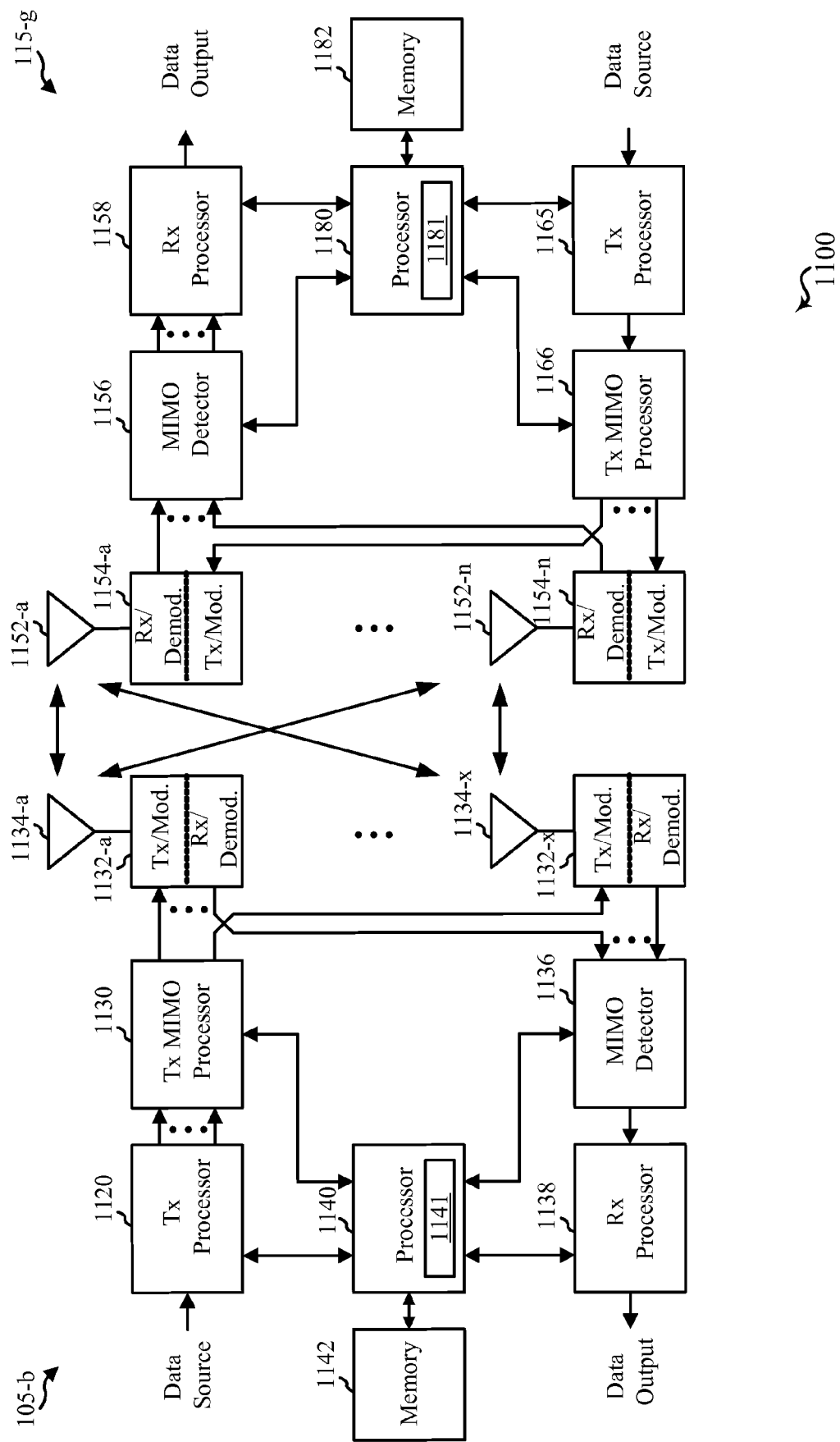
FIG. 11 shows a block diagram that illustrates an example of a multiple-input multiple-output (MIMO) communications system according to various embodiments.

FIG. 11 shows a block diagram of a MIMO communication system 1100 including a base station 105-*b* and a wireless terminal 115-*g*. The base station 105-*b* and the wireless terminal 115-*g* may support LTE-based communications. The base station 105-*b* may be an example of the base stations 105 of FIG. 1 and FIG. 2, while the wireless terminal 115-*g* may be an example of the UEs, stations, and wireless terminals 115 of FIG. 1, FIG. 2, FIG. 3, FIG. 5, and FIG. 9. The wireless terminal 115-*g* may be a multi-radio wireless terminal having a Wi-Fi modem or modem in addition to a cellular (e.g., LTE) modem or modem. The system 1100 may illustrate aspects of the system 100 of FIG. 1 and aspects of the portions of the system 200 shown in FIG. 2.

The base station 105-*b* may be equipped with antennas 1134-*a* through 1134-*x*, and the wireless terminal 115-*g* may be equipped with antennas 1152-*a* through 1152-*n*. In the system 1100, the base station 105-*b* may be able to send data over multiple communication links at the same time. Each communication link may be called a "layer" and the "rank" of the communication link may indicate the number of layers used for communication. For example, in a 2×2 MIMO system where base station 105-*b* transmits two "layers," the rank of the communication link between the base station 105-*b* and the wireless terminal 115-*g* is two.

At the base station 105-*b*, a transmit (Tx) processor 1120 may receive data from a data source. The transmit processor 1120 may process the data. The transmit processor 1120 may also generate reference symbols, and a cell-specific reference signal. A transmit (Tx) MIMO processor 1130 may perform spatial processing (e.g., precoding) on data symbols, control symbols, and/or reference symbols, if applicable, and may provide output symbol streams to the transmit modulators 1132-*a* through 1132-*x*. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-*a* through 1132-*x* may be transmitted via the antennas 1134-*a* through 1134-*x*, respectively.

At the wireless terminal 115-*g*, the antennas 1152-*a* through 1152-*n* may receive the DL signals from the base station 105-*b* and may provide the received signals to the demodulators 1154-*a* through 1154-*n*, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-*a* through 1154-*n*, perform MIMO detection on the received symbols if applicable, and provide detected symbols. A receive (Rx) processor 1158 may process (e.g., demodulate, deinterleave, and decode) the detected symbols, providing decoded data for the wireless terminal 115-g to a data output, and provide decoded control information to a processor 1180, or memory 1182. The processor 1180 may include a module or function 1181 that may perform various functions related to handling LTE/Wi-Fi coexistence interference. For example, the module or function 1181 may enable an LTE modem detecting Wi-Fi interference to handle such interference and/or may enable an LTE modem producing interference on a co-located Wi-Fi modem to coordinate and cooperate with the Wi-Fi modem to reduce the effects of the interference.

On the uplink (UL), at the wireless terminal 115-g, a transmit (Tx) processor 1164 may receive and process data from a data source. The transmit processor 1164 may also generate reference symbols for a reference signal. The symbols from the transmit processor 11164 may be precoded by a transmit (Tx) MIMO processor 1166 if applicable, further processed by the demodulators 1154-a through 1154-n (e.g., for SC-FDMA, etc.), and be transmitted to the base station 105-b in accordance with the transmission parameters received from the base station 105-b. At the base station 105-b, the UL signals from the wireless terminal 115-g may be received by the antennas 1134, processed by the demodulators 1132, detected by a MIMO detector 1136 if applicable, and further processed by a receive processor. The receive (Rx) processor 1138 may provide decoded data to a data output and to the processor 1140. The processor 1140 may include a module or function 1141 that may provide assistance to the wireless terminal 115-g to handle LTE/Wi-Fi coexistence interference.

The components of the base station 105-b may, individually or collectively, be implemented with one or more ASICs adapted to perform some or all of the applicable functions in hardware. Each of the noted modules may be a means for performing one or more functions related to operation of the system 1100. Similarly, the components of the wireless terminal 115-g may, individually or collectively, be implemented with one or more ASICs adapted to perform some or all of the applicable functions in hardware. Each of the noted components may be a means for performing one or more functions related to operation of the system 1100.

Figure 12:
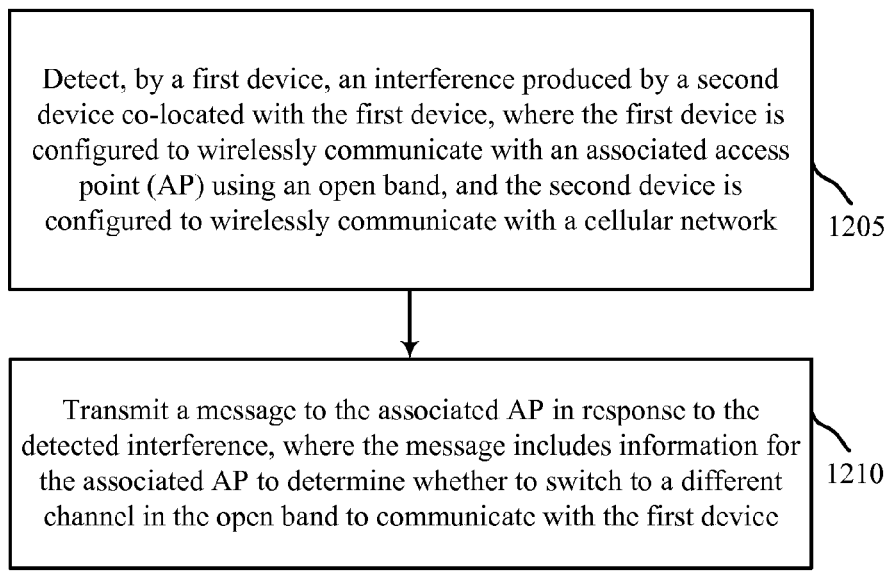
FIGS. 12 and 13 are flowcharts of examples of methods for wireless communications coexistence (e.g., at a wireless terminal) according to various embodiments.

FIG. 12 is a flow chart illustrating an example of a method 1200 for wireless communications coexistence. For clarity, the method 1200 is described below with reference to one of the wireless devices or terminals, devices, and/or APs shown in FIG. 1, FIG. 2, FIG. 3, FIG. 5, FIG. 6, FIG. 7A, FIG. 7B, FIG. 8A, FIG. 8B, FIG. 9, FIG. 10, and/or FIG. 11. In one embodiment, one of the wireless stations may execute one or more sets of codes to control the functional elements of the wireless station to perform the functions described below.

At block 1205, interference produced at a first device (e.g., open band modem 320) by a second device (e.g., cellular band modem 310) co-located with the first device is detected. The first device is configured to wirelessly communicate with an associated access point (AP) using an open band (e.g., ISM or Wi-Fi band), and the second device is configured to wirelessly communicate with a cellular network (e.g., LTE network).

At block 1210, a message (e.g., rCSR IE) is transmitted to the associated AP (e.g., AP 120) in response to the detected interference. The message may include information for the associated AP to determine whether to switch to a different channel in the open band to communicate with the first device In some embodiments of the method 1200, the information in the message includes a request that the associated AP communicate with the first device using a different channel in the open band, one or more parameters associated with the detected interference, or both. The one or more parameters may include one or more of a packet error rate of the first device, a signal-to-noise ratio drop of the first device, and a transmission signal power of the second device.

In some embodiments of the method 1200, the method further includes receiving in response to the message transmitted to the associated AP, a message (e.g., modified CSA IE) from the associated AP indicating a switch to a different channel in the open band for communication with the first device. The method further includes switching operation of the first device to the different channel in the open band in response to the message received from the associated AP.

Thus, the method 1200 may provide for wireless communications coexistence. It should be noted that the method 1200 is just one implementation and that the operations of the method 1200 may be rearranged or otherwise modified such that other implementations are possible. In some instances, aspects of the method 1200 may be combined with aspects of other methods described herein.

Figure 13:
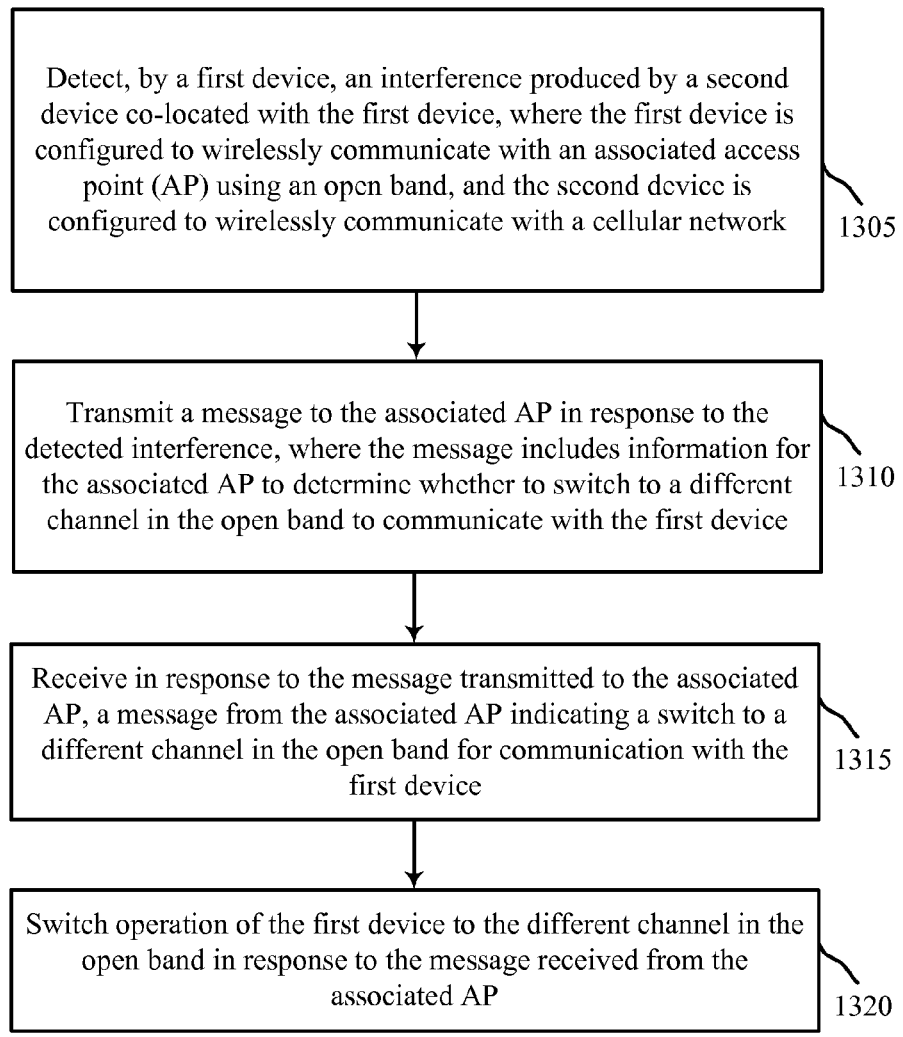

FIG. 13 is a flow chart illustrating an example of a method 1300 for wireless communications coexistence. For clarity, the method 1300 is described below with reference to one of the wireless devices or terminals, devices, and/or APs shown in FIG. 1, FIG. 2, FIG. 3, FIG. 5, FIG. 6, FIG. 7A, FIG. 7B, FIG. 8A, FIG. 8B, FIG. 9. FIG. 10, and/or FIG. 11. In one embodiment, one of the wireless stations may execute one or more sets of codes to control the functional elements of the wireless station to perform the functions described below.

At block 1305, interference produced at a first device (e.g., open band modem 320) by a second device (e.g., cellular band modem 310) co-located with the first device is detected. The first device is configured to wirelessly communicate with an associated access point (AP) using an open band (e.g., ISM or Wi-Fi band), and the second device is configured to wirelessly communicate with a cellular network (e.g., LTE network).

At block 1310, a message (e.g., rCSR IE) is transmitted to the associated AP (e.g., AP 120) in response to the detected interference. The message may include information for the associated AP to determine whether to switch to a different channel in the open band to communicate with the first device At block 1315, a message (e.g., modified CSA IE) is received in response to the message transmitted to the associated AP. The message is received from the associated AP and indicates a switch to a different channel in the open band for communication with the first device.

At block 1320, operation of the first device is switched method to the different channel in the open band in response to the message received from the associated AP.

Thus, the method 1300 may provide for wireless communications coexistence. It should be noted that the method 1300 is just one implementation and that the operations of the method 1300 may be rearranged or otherwise modified such that other implementations are possible. In some instances, aspects of the method 1300 may be combined with aspects of other methods described herein.

Figure 14:
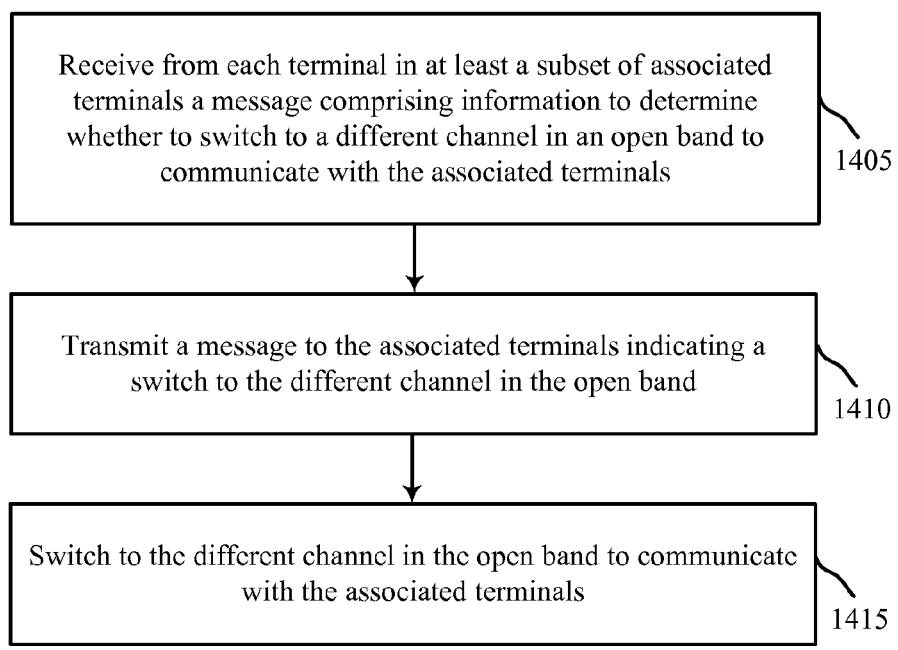
FIGS. 14-16 are flowcharts of examples of methods for wireless communications coexistence (e.g., at an AP) according to various embodiments.

FIG. 14 is a flow chart illustrating an example of a method 1400 for wireless communications coexistence. For clarity, the method 1400 is described below with reference to one of the wireless devices or terminals, devices, and/or APs shown in FIG. 1, FIG. 2, FIG. 3, FIG. 5, FIG. 6, FIG. 7A, FIG. 7B, FIG. 8A, FIG. 8B, FIG. 9, FIG. 10, and/or FIG. 11. In one embodiment, one of the APs may execute one or more sets of codes to control the functional elements of the AP to perform the functions described below.

At block 1405, a message (e.g., rCSR IE) is received from each terminal in at least a subset of associated terminals (e.g., first set 510), where the message includes information to determine whether to switch to a different channel in an open band (e.g., ISM or Wi-Fi band) to communicate with the associated terminals.

At block 1410, a message (e.g., modified CSA IE) is transmitted to the associated terminals indicating a switch to the different channel in the open band.

At block 1415, a switch is made to the different channel in the open band to communicate with the associated terminals.

In some embodiments of the method 1400, the associated terminals are of a first type and additional associated terminals are of a second type. In these embodiments, a message (e.g., modified CSA IE) is transmitted to the additional associated terminals indicating a switch to the different channel in the open band. A switch is made to the different channel in the open band to communicate with the associated terminals and with the additional associated terminals. The first type of terminals may involve terminals having a modem device from a first vendor (or manufacturer) for communication in the open band, and the second type of terminals may involve terminals having a modem device from a second vendor (or manufacturer) for communication in the open band.

In some embodiments of the method 1400, the associated terminals are of a first type and additional associated terminals are of a second type. In these embodiments, a current channel in the open band is maintained to communicate with the additional associated terminals while switching to the different channel in the open band to communicate with the associated terminals. Maintaining the current channel in the open band to communicate with the additional associated terminals involves maintaining the additional associated terminals in a virtual device (e.g., AP VDEV 610) for the current channel. Switching to the different channel in the open band to communicate with the associated terminals involves spawning a separate virtual device (e.g., AP VDEV 610-a) for the different channel.

In some embodiments of the method 1400, a number of terminals transmitting the message are identified and a determination is made as to whether to switch to the different channel based at least in part on the number of terminals transmitting the message. Determining whether to switch to the different channel involves determining whether the number of terminals transmitting the message is greater than a threshold value.

In some embodiments of the method 1400, a subset of the associated terminals for a downlink multi-user (MU) multiple-input multiple-output (MIMO) communications group is identified and a switch is made to the different channel in the open band to communicate with the identified subset forming the downlink MU MIMO communications group. A subset of the associated terminals may be identified based on one or more of a throughput category being greater than a threshold value, a number of Rx/Tx antenna chains being greater than another threshold value, and an MCS rate being greater than yet another threshold value. A switch to the different channel in the open band may be made to communicate with the identified subset. Moreover, a subset of the associated terminals may be identified based on one or more of a throughput category being less than a threshold value, a number of Rx/Tx antenna chains being less than another threshold value, and an MCS rate being less than yet another threshold value. A switch to the different channel in the open band may be made to communicate with the identified subset In some embodiments of the method 1400, an interference parameter corresponding to each of the terminals transmitting the message is identified and a determination is made as to whether to switch to the different channel based at least in part on the interference parameter corresponding to each of the terminals transmitting the message. Determining whether to switch to the different channel involves determining whether a combination of the interference parameter corresponding to each of the terminals transmitting the message produces an interference value greater than a threshold value. The interference parameter may include one or more of a packet error rate of a first device (e.g., open band modem 320) in the terminal (e.g., multi-radio wireless terminal) affected by the interference, a signal-to-noise ratio drop of the first device, and a transmission signal power of a second device (e.g., cellular band modem 310) in the terminal causing the interference on the first device.

Thus, the method 1400 may provide for wireless communications coexistence. It should be noted that the method 1400 is just one implementation and that the operations of the method 1400 may be rearranged or otherwise modified such that other implementations are possible. In some instances, aspects of the method 1400 may be combined with aspects of other methods described herein.

Figure 15:
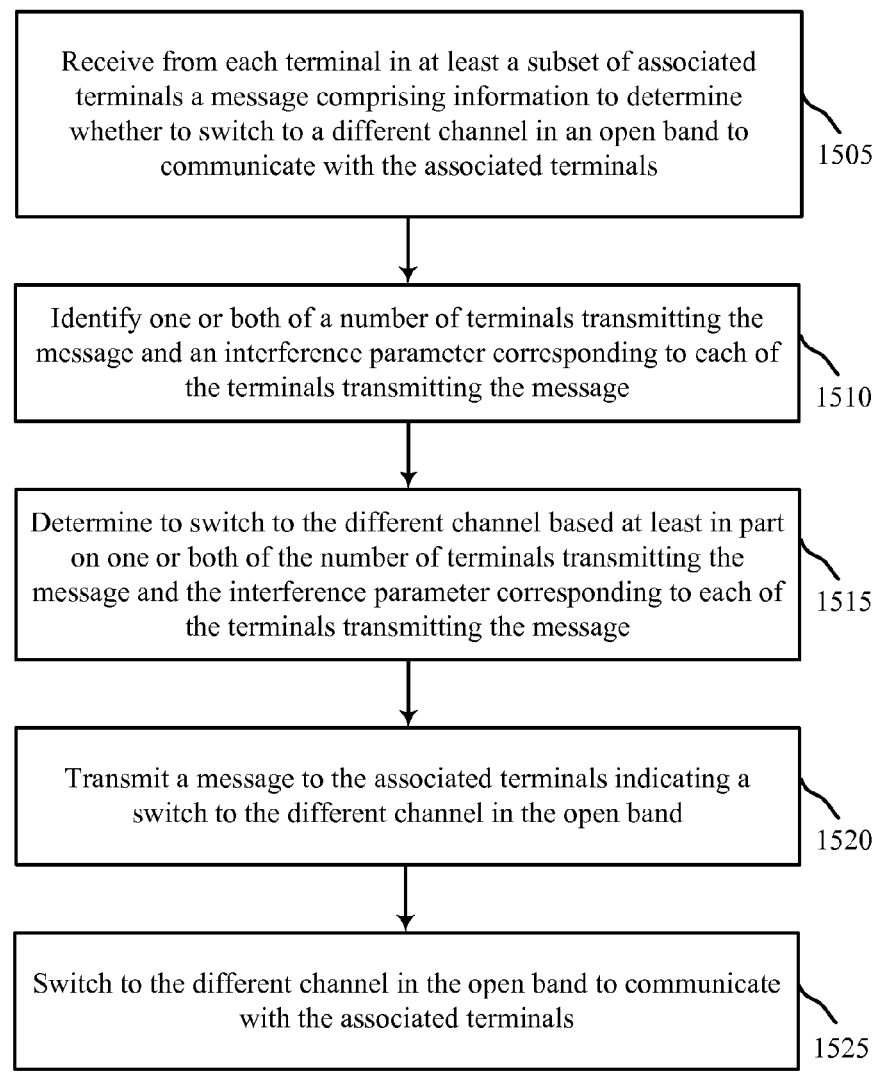

FIG. 15 is a flow chart illustrating an example of a method 1500 for wireless communications coexistence. For clarity, the method 1500 is described below with reference to one of the wireless devices or terminals, devices, and/or APs shown in FIG. 1, FIG. 2, FIG. 3, FIG. 5, FIG. 6, FIG. 7A, FIG. 7B, FIG. 8A, FIG. 8B, FIG. 9, FIG. 10, and/or FIG. 11. In one embodiment, one of the APs may execute one or more sets of codes to control the functional elements of the AP to perform the functions described below.

At block 1505, a message (e.g., rCSR IE) is received from each terminal in at least a subset of associated terminals (e.g., first set 510), where the message includes information to determine whether to switch to a different channel in an open band (e.g., ISM or Wi-Fi band) to communicate with the associated terminals.

At block 1510, a number (or percentage) of terminals transmitting the message and/or an interference parameter corresponding to each of the terminals transmitting the message are identified.

At block 1515, a determination is made to switch to the different channel based at least in part on the number (or percentage) of terminals transmitting the message and/or an the interference parameter corresponding to each of the terminals transmitting the message are identified.

At block 1520, a message (e.g., modified CSA IE) is transmitted to the associated terminals indicating a switch to the different channel in the open band.

At block 1525, a switch is made to the different channel in the open band to communicate with the associated terminals.

Thus, the method 1500 may provide for wireless communications coexistence. It should be noted that the method 1500 is just one implementation and that the operations of the method 1500 may be rearranged or otherwise modified such that other implementations are possible. In some instances, aspects of the method 1500 may be combined with aspects of other methods described herein.

Figure 16:
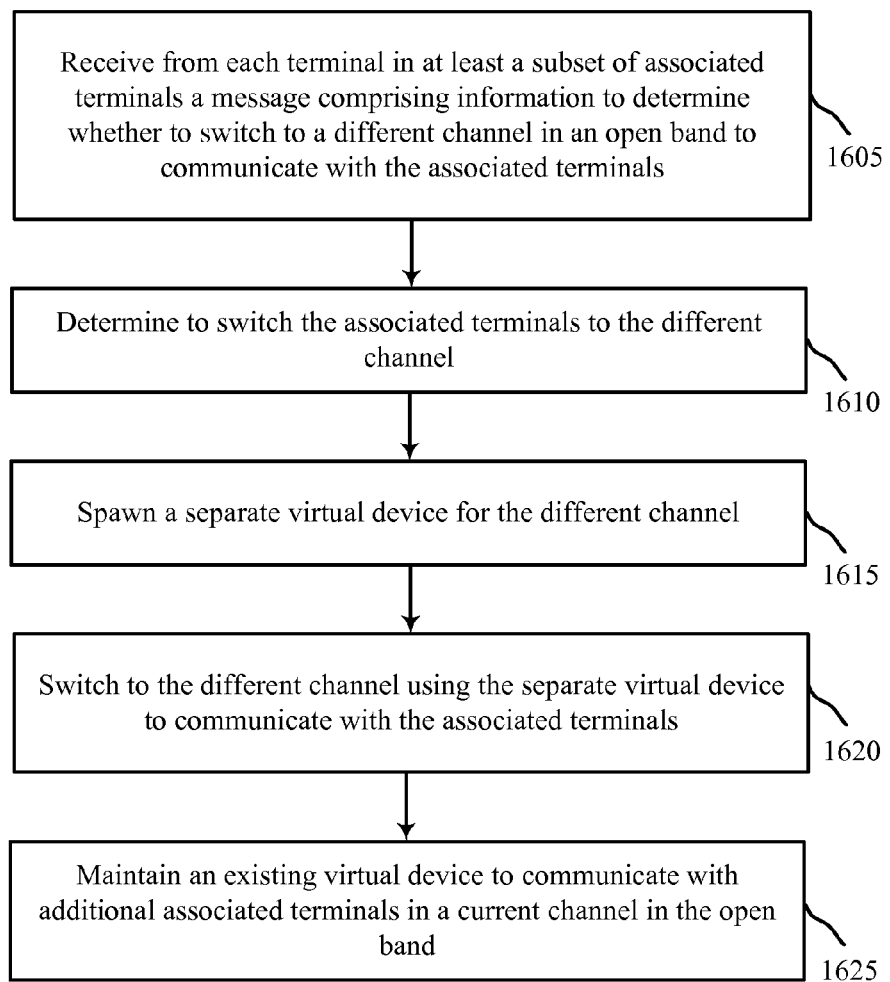

FIG. 16 is a flow chart illustrating an example of a method 1600 for wireless communications coexistence. For clarity, the method 1600 is described below with reference to one of the wireless devices or terminals, devices, and/or APs shown in FIG. 1, FIG. 2, FIG. 3, FIG. 5, FIG. 6, FIG. 7A, FIG. 7B, FIG. 8A, FIG. 8B, FIG. 9, FIG. 10, and/or FIG. 11. In one embodiment, one of the APs may execute one or more sets of codes to control the functional elements of the AP to perform the functions described below.

At block 1605, a message (e.g., rCSR IE) is received from each terminal in at least a subset of associated terminals (e.g., first set 510), where the message includes information to determine whether to switch to a different channel in an open band (e.g., ISM or Wi-Fi band) to communicate with the associated terminals.

At block 1610, a determination is made to switch the associated terminals to the different channel.

At block 1615, a separate virtual device (e.g., AP VDEV 610-a) is spawned or generated for the different channel (e.g., channel Y without LTE interference).

At block 1620, a switch is made to the different channel using the separate virtual device to communicate with the associated terminals.

At block 1625, maintain an existing virtual device (e.g., AP VDEV 610) to communicate with additional associated terminals (e.g., second set 520, third set 530) in a current channel in the open band (e.g., channel X with LTE interference).

Thus, the method 1600 may provide for wireless communications coexistence. It should be noted that the method 1600 is just one implementation and that the operations of the method 1600 may be rearranged or otherwise modified such that other implementations are possible. In some instances, aspects of the method 1600 may be combined with aspects of other methods described herein.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications coexistence, comprising:
receiving from each terminal in at least a subset of associated terminals a message comprising information to determine whether to switch to a different channel in an open band to communicate with the associated terminals, wherein the associated terminals are of a first type and additional associated terminals are of a second type;

transmitting a message to the associated terminals indicating a switch to the different channel in the open band, wherein the transmitting is in response to receiving the message from each terminal in the subset of associated terminals;

switching to the different channel in the open band to communicate with the associated terminals; and maintaining a current channel in the open band to communicate with the additional associated terminals while switching to the different channel in the open band to communicate with the associated terminals.

2. The method of claim 1, further comprising:
transmitting a message to the additional associated terminals indicating a switch to the different channel in the open band; and
switching to the different channel in the open band to communicate with the associated terminals and with the additional associated terminals.

3. The method of claim 2, wherein:
the first type of terminals comprise terminals having a modem device from a first vendor for communication in the open band; and
the second type of terminals comprise terminals having a modem device from a second vendor for communication in the open band.

4. The method of claim 1, wherein:
maintaining the current channel in the open band to communicate with the additional associated terminals comprises maintaining the additional associated terminals in a virtual device for the current channel; and
switching to the different channel in the open band to communicate with the associated terminals comprises spawning a separate virtual device for the different channel.

5. The method of claim 1, further comprising:
identifying a number of terminals transmitting the message; and
determining whether to switch to the different channel based at least in part on the number of terminals transmitting the message.

6. The method of claim 5, wherein determining whether to switch to the different channel comprises determining whether the number of terminals transmitting the message is greater than a threshold value.

7. The method of claim 1, further comprising:
identifying a subset of the associated terminals for a downlink multi-user (MU) multiple-input multiple-output (MIMO) communications group; and
switching to the different channel in the open band to communicate with the identified subset forming the downlink MU MIMO communications group.

8. The method of claim 1, further comprising:
identifying a subset of the associated terminals based on one or more of a throughput category being greater than a threshold value, a number of receive/transmit (Rx/Tx) antenna chains being greater than another threshold value, and a modulation and coding scheme (MCS) rate being greater than yet another threshold value; and
switching to the different channel in the open band to communicate with the identified subset.

9. The method of claim 1, further comprising:
identifying a subset of the associated terminals based on one or more of a throughput category being less than a threshold value, a number of Rx/Tx antenna chains being less than another threshold value, and an MCS rate being less than yet another threshold value; and
switching to the different channel in the open band to communicate with the identified subset.

10. The method of claim 1, further comprising:
identifying an interference parameter corresponding to each of the terminals transmitting the message; and
determining whether to switch to the different channel based at least in part on the interference parameter corresponding to each of the terminals transmitting the message.

11. The method of claim 10, wherein determining whether to switch to the different channel comprises determining whether a combination of the interference parameter corresponding to each of the terminals transmitting the message produces an interference value greater than a threshold value.

12. The method of claim 10, wherein the interference parameter comprises one or more of:
a packet error rate of a first device in the terminal affected by the interference;
a signal-to-noise ratio drop of the first device; and
a transmission signal power of a second device in the terminal causing the interference on the first device.

13. An apparatus for wireless communications coexistence, comprising:
means for detecting, by a first device, an interference produced by a second device co-located with the first device, the first device being configured to wirelessly communicate with an associated access point (AP) using an open band, and the second device being configured to wirelessly communicate with a cellular network;
means for transmitting a message to the associated AP in response to the detected interference, the message comprising information for the associated AP to determine whether to switch to a different channel in the open band to communicate with the first device, wherein the information in the message comprises one or both of a request that the associated AP communicate with the first device using a different channel in the open band and one or more parameters associated with the detected interference; and
means for receiving in response to the message transmitted to the associated AP, a message from the associated AP indicating a switch to the different channel in the open band for communication with the first device.

14. The apparatus of claim 13, wherein the one or more parameters comprise one or more of:
a packet error rate of the first device;
a signal-to-noise ratio drop of the first device; and
a transmission signal power of the second device.

15. An apparatus for wireless communications coexistence, comprising:
means for receiving from each terminal in at least a subset of associated terminals a message comprising information to determine whether to switch to a different channel in an open band to communicate with the associated terminals, wherein the associated terminals are of a first type and additional associated terminals are of a second type;
means for transmitting a message to the associated terminals indicating a switch to the different channel in the open band, wherein the transmitting is in response to receiving the message from each terminal in the subset of associated terminals;

means for switching to the different channel in the open band to communicate with the associated terminals; and means for maintaining a current channel in the open band to communicate with the additional associated terminals while switching to the different channel in the open band to communicate with the associated terminals.

16. The apparatus of claim 15, further comprising:

means for transmitting a message to the additional associated terminals indicating a switch to the different channel in the open band; and means for switching to the different channel in the open band to communicate with the associated terminals and with the additional associated terminals.

17. The apparatus of claim 16, wherein:

the first type of terminals comprise terminals having a modem device from a first vendor for communication in the open band; and the second type of terminals comprise terminals having a modem device from a second vendor for communication in the open band.

18. The apparatus of claim 15, wherein:

the means for maintaining the current channel in the open band to communicate with the additional associated terminals comprise means for maintaining the additional associated terminals in a virtual device for the current channel; and the means for switching to the different channel in the open band to communicate with the associated terminals comprise means for spawning a separate virtual device for the different channel.

19. The apparatus of claim 15, further comprising:

means for identifying one or both of a number of terminals transmitting the message and an interference parameter corresponding to each of the terminals transmitting the message; and means for determining whether to switch to the different channel based at least in part on one or both of the number of terminals transmitting the message and the interference parameter corresponding to each of the terminals transmitting the message.

20. The apparatus of claim 19, wherein the interference parameter comprises one or more of:

a packet error rate of a first device in the terminal affected by the interference;

a signal-to-noise ratio drop of the first device; and a transmission signal power of a second device in the terminal causing the interference on the first device.

21. The apparatus of claim 15, further comprising:

means for identifying a subset of the associated terminals for a downlink multi-user (MU) multiple-input multiple-output (MIMO) communications group; and means for switching to the different channel in the open band to communicate with the identified subset forming the downlink MU MIMO communications group.

22. The apparatus of claim 15, further comprising:

means for identifying a subset of the associated terminals based on one or more of a throughput category being greater than a threshold value, a number of receive/transmit (Rx/Tx) antenna chains being greater than another threshold value, and a modulation and coding scheme (MCS) rate being greater than yet another threshold value; and means for switching to the different channel in the open band to communicate with the identified subset.

23. An apparatus for wireless communications coexistence, comprising:

a receiver configured to receive from each terminal in at least a subset of associated terminals a message comprising information to determine whether to switch to a different channel in an open band to communicate with the associated terminals;

a message module configured to generate a message to the associated terminals indicating a switch to the different channel in the open band, wherein the associated terminals are of a first type and additional associated terminals are of a second type;

a transmitter configured to transmit the message to the associated terminals, wherein the transmitting is in response to receiving the message from each terminal in the subset of associated terminals; and a channel switch configured to switch to the different channel in the open band to communicate with the associated terminals, and further configured to maintain a current channel in the open band to communicate with the additional associated terminals while switching to the different channel in the open band to communicate with the associated terminals.

24. The apparatus of claim 23, wherein:

the message module is further configured to generate a message to the additional associated terminals indicating a switch to the different channel in the open band;

the transmitter is further configured to transmit the message to the additional associated terminals; and the channel switch is further configured to switch to the different channel in the open band to communicate with the associated terminals and with the additional associated terminals.

25. The apparatus of claim 24, wherein:

the first type of terminals comprise terminals having a modem device from a first vendor for communication in the open band; and the second type of terminals comprise terminals having a modem device from a second vendor for communication in the open band.

26. The apparatus of claim 23, wherein the channel switch is further configured to:

maintain the current channel in the open band to communicate with the additional associated terminals by maintaining the additional associated terminals in a virtual device for the current channel; and switch to the different channel in the open band to communicate with the associated terminals by spawning a separate virtual device for the different channel.

27. The apparatus of claim 23, wherein:

the message module is further configured to identify one or both of a number of terminals transmitting the message and an interference parameter corresponding to each of the terminals transmitting the message; and the channel switch is further configured to determine whether to switch to the different channel based at least in part on one or both of the number of terminals transmitting the message and the interference parameter corresponding to each of the terminals transmitting the message.

28. The apparatus of claim 27, wherein the interference parameter comprises one or more of:

a packet error rate of a first device in the terminal affected by the interference;

a signal-to-noise ratio drop of the first device; and a transmission signal power of a second device in the terminal causing the interference on the first device.

29. A computer program product, comprising:

a non-transitory computer-readable medium comprising:

code for causing at least one computer to receive from each terminal in at least a subset of associated terminals a message comprising information to determine whether to switch to a different channel in an open band to communicate with the associated terminals, wherein the associated terminals are of a first type and additional associated terminals are of a second type;

code for causing the at least one computer to transmit a message to the associated terminals indicating a switch to the different channel in the open band;

code for causing the at least one computer to switch to the different channel in the open band to communicate with the associated terminals; and code for maintaining a current channel in the open band to communicate with the additional associated terminals while switching to the different channel in the open band to communicate with the associated terminals.

\* \* \* \* \*